United States Patent
Makihira et al.

(10) Patent No.: US 10,597,296 B2
(45) Date of Patent: Mar. 24, 2020

(54) METHOD FOR SUPPLYING OZONE GAS AND SYSTEM FOR SUPPLYING OZONE GAS

(71) Applicant: IWATANI CORPORATION, Osaka (JP)

(72) Inventors: Naohisa Makihira, Tokyo (JP); Koichi Izumi, Amagasaki (JP); Masahiro Furutani, Amagasaki (JP)

(73) Assignee: IWATANI CORPORATION, Osaka (JP)

( * ) Notice: Subject to any disclaimer, the term of this patent is extended or adjusted under 35 U.S.C. 154(b) by 33 days.

(21) Appl. No.: 15/761,040

(22) PCT Filed: Jun. 29, 2016

(86) PCT No.: PCT/JP2016/069299
§ 371 (c)(1),
(2) Date: Mar. 16, 2018

(87) PCT Pub. No.: WO2017/047201
PCT Pub. Date: Mar. 23, 2017

(65) Prior Publication Data
US 2018/0257934 A1 Sep. 13, 2018

(30) Foreign Application Priority Data
Sep. 18, 2015 (JP) .................................. 2015-185747

(51) Int. Cl.
*C01B 13/11* (2006.01)
*B01D 53/04* (2006.01)

(52) U.S. Cl.
CPC .............. *C01B 13/11* (2013.01); *B01D 53/04* (2013.01); *B01D 53/0407* (2013.01);
(Continued)

(58) Field of Classification Search
None
See application file for complete search history.

(56) References Cited

U.S. PATENT DOCUMENTS 5,492,676 A    2/1996   Katatani et al.
6,136,284 A   10/2000   Hwang et al.
(Continued)

FOREIGN PATENT DOCUMENTS

CN    1490242 A      4/2004
JP    S53-113295 A  10/1978
(Continued)

OTHER PUBLICATIONS

International Search Report issued in PCT/JP2016/069299; dated Aug. 16, 2016.
(Continued)

*Primary Examiner* — Kishor Mayekar
(74) *Attorney, Agent, or Firm* — Studebaker & Brackett PC

(57) ABSTRACT

A method for supplying an ozone gas includes the steps of: supplying an ozone gas from an ozone gas source through a second channel; and switching the ozone gas to a state where the ozone gas is supplied through a first channel and supplying the ozone gas having a reduced concentration of nitrogen oxide. The step of supplying the ozone gas through the second channel includes the step of introducing a part of the ozone gas to a first vessel so that ozone adsorbability of a first adsorbent is reduced. In the step of supplying the ozone gas to the object through the first channel, the ozone gas passes through the first vessel holding the first adsorbent having reduced ozone adsorbability.

12 Claims, 17 Drawing Sheets

(52) U.S. Cl.
CPC ..... *B01D 53/0446* (2013.01); *B01D 53/0454* (2013.01); *B01D 2253/106* (2013.01); *B01D 2256/14* (2013.01); *B01D 2257/404* (2013.01); *B01D 2259/40086* (2013.01); *B01D 2259/40088* (2013.01)

(56) References Cited

U.S. PATENT DOCUMENTS

| | | | |
|---|---|---|---|
| 10,221,068 B2 * | 3/2019 | Wada | ..................... C01B 13/11 |
| 2004/0028576 A1 | 2/2004 | Jain | |
| 2011/0052483 A1 | 3/2011 | Tabata et al. | |

FOREIGN PATENT DOCUMENTS

| | | |
|---|---|---|
| JP | S57-183304 A | 11/1982 |
| JP | 2000-290004 A | 10/2000 |
| JP | 2011-121805 A | 6/2011 |
| JP | 4698819 B2 | 6/2011 |
| JP | 2013-180931 A | 9/2013 |
| JP | 2014-065620 A | 4/2014 |
| JP | 2015-010016 A | 1/2015 |
| WO | 2009/069774 A1 | 6/2009 |

OTHER PUBLICATIONS

An Office Action mailed by the Japanese Patent Office dated May 29, 2018, which corresponds to Japanese Patent Application No. 2014-265587 and is related to U.S. Appl. No. 15/761,040.

An Office Action mailed by the Taiwanese Patent Office dated Nov. 20, 2019, which corresponds to Taiwanese Patent Application No. 105121393 and is related to U.S. Appl. No. 15/761,040.

* cited by examiner

METHOD FOR SUPPLYING OZONE GAS AND SYSTEM FOR SUPPLYING OZONE GAS

TECHNICAL FIELD

The present invention relates to a method for supplying an ozone gas and a system for supplying an ozone gas.

BACKGROUND ART

An ozone gas, which has strong oxidative power and has no remaining toxicity after being decomposed, has been widely used for deodorants, bactericides, oxidation treatment of semiconductors, and so forth.

An ozone gas can be generated by electric discharge in an atmosphere containing an oxygen gas, for example. In the case of generating an ozone gas in this manner, it is known that addition of a trace amount of a nitrogen gas to an oxygen gas as a raw material increases the concentration of the ozone gas and enhances stability with time. In such a case of adding a trace amount of a nitrogen gas to an oxygen gas as a raw material, the added nitrogen gas partially becomes a nitrogen oxide. This nitrogen oxide can cause corrosion of pipes serving as channels for gases.

As a technique for removing a nitrogen oxide contained in an ozone gas, a method for removing a nitrogen oxide by introducing an ozone gas in which the nitrogen oxide is mixed into a removing cylinder filled with silica gel is proposed. (see, for example, Japanese Patent Application Laid-Open No. 2011-121805: Patent Document 1).

CITATION LIST

Patent Literature

Patent Literature 1: Japanese Patent Application Laid-Open No. 2011-121805

SUMMARY OF INVENTION

Technical Problem

In the case of performing the removal of a nitrogen oxide using silica gel, however, the ozone concentration in the gas to be supplied becomes unstable in some cases.

It is therefore an object of the present invention to provide a method and a system for supplying an ozone gas that can supply an ozone gas of a stable concentration from which a nitrogen oxide is removed.

Solution to Problem

A method for supplying an ozone gas according to a first aspect of the present invention is a method for supplying an ozone gas containing a nitrogen oxide from an ozone gas source to an object while switching the ozone gas between a state where the ozone gas is supplied to the object through a first channel provided with a first vessel holding a first adsorbent of silica gel and a state where the ozone gas is supplied to the object through a second channel. This method for supplying an ozone gas includes the steps of: supplying the ozone gas from the ozone gas source to the object through the second channel; and switching the ozone gas from the ozone gas source to the state where the ozone gas is supplied to the object through the first channel so that the nitrogen oxide is adsorbed on the first adsorbent and supplying the ozone gas having a reduced concentration of the nitrogen oxide to the object.

The step of supplying the ozone gas from the ozone gas source through the second channel includes the step of, while supplying the ozone gas from the ozone gas source to the object through the second channel, introducing a part of the ozone gas from the ozone gas source to the first vessel so that the ozone gas is adsorbed on the first adsorbent and ozone adsorbability of the first adsorbent is reduced. In the step of supplying the ozone gas from the ozone gas source to the object through the first channel, the ozone gas passes through the first vessel holding the first adsorbent whose ozone adsorbability is reduced in the step of reducing ozone adsorbability of the first adsorbent.

In the method for supplying an ozone gas according to the first aspect of the present invention, the ozone gas from the ozone gas source is switched from the state where the ozone gas from the ozone gas source is supplied to the object through the second channel to the state where the ozone gas from the ozone gas source is supplied to the object through the first channel. In this manner, the nitrogen oxide is adsorbed on the first adsorbent of silica gel in the first vessel disposed on the first channel, and the ozone gas having a reduced nitrogen oxide concentration is supplied to the object. At this time, silica gel has a property of adsorbing not only the nitrogen oxide but also the ozone gas. Thus, if no measures are provided, the ozone gas is adsorbed on the first adsorbent, and the concentration of the ozone gas to be supplied to the object decreases. Consequently, the concentration of the ozone gas to be supplied to the object can be unstable in some cases.

In the method for supplying an ozone gas according to the present invention, the step of supplying the ozone gas from the ozone gas source through the second channel includes the step of reducing ozone adsorbability of the first adsorbent. In the step of supplying the ozone gas from the ozone gas source through the first channel, the ozone gas passes through the first vessel holding the first adsorbent whose ozone adsorbability is reduced in the step of reducing ozone adsorbability of the first adsorbent. Accordingly, adsorption of the ozone gas on the first adsorbent is reduced so that the concentration of the ozone gas can be stabilized. In the manner described above, with the method for supplying an ozone gas according to the first aspect of the present invention, the ozone gas from which the nitrogen oxide is removed can be supplied at a stable concentration.

In the method for supplying an ozone gas according to the first aspect, in the step of switching the ozone gas from the ozone gas source to the state where the ozone gas is supplied to the object through the first channel so that the nitrogen oxide is adsorbed on the first adsorbent and supplying the ozone gas having a reduced concentration of the nitrogen oxide to the object, if nitrogen oxide concentration rise information that is information on a timing of a rise of a concentration of the nitrogen oxide contained in the ozone gas from the ozone gas source is detected, the ozone gas may be switched to the state where the ozone gas is supplied to the object through the first channel based on the nitrogen oxide concentration rise information. In this manner, the ozone gas can be switched to the state where the nitrogen oxide is adsorbed in the first vessel at an appropriate timing.

In the method for supplying an ozone gas according to the first aspect, in the ozone gas source, the ozone gas may be generated by electric discharge between electrodes disposed in a gas containing an oxygen gas as a main component. The nitrogen oxide concentration rise information may be information of a timing of a rise of a concentration of the nitrogen oxide by heating the electrodes to a temperature greater than or equal to a temperature at which dinitrogen pentoxide is vaporized.

In the case where the ozone gas is generated by electric discharge between the electrodes disposed in the gas containing the oxygen gas as a main component, dinitrogen pentoxide might be attached to the electrodes to cause degradation of ozone generation efficiency in some cases. Dinitrogen pentoxide attached to the electrodes can be vaporized and removed by heating the electrodes. At this time, the vaporized dinitrogen pentoxide is mixed in the generated ozone so that the concentration of the nitrogen oxide contained in the ozone gas from the ozone gas source increases. By switching the ozone gas to the state where the ozone gas is supplied to the object through the first channel using information on the timing of heating the electrodes as the nitrogen oxide concentration rise information, the nitrogen oxide is adsorbed on the first adsorbent, and the ozone gas having a reduced nitrogen oxide concentration can be supplied to the object.

In the method for supplying an ozone gas according to the first aspect, the step of supplying the ozone gas from the ozone gas source through the second channel may further include, before the step of reducing ozone adsorbability of the first adsorbent, the step of restoring nitrogen oxide adsorbability of the first adsorbent by introducing a purge gas into the first vessel while heating the first adsorbent in the first vessel so that the nitrogen oxide adsorbed on the first adsorbent is separated and by emitting the separated nitrogen oxide out of the first vessel with the purge gas.

By performing the step of reducing ozone adsorbability of the first adsorbent after the step of restoring nitrogen oxide adsorbability of the first adsorbent, the ozone gas can be switched to the state where the ozone gas is supplied to the object through the first channel in a state where the first adsorbent has sufficient nitrogen oxide adsorbability and reduced ozone adsorbability.

In the method for supplying an ozone gas according to the first aspect, in the ozone gas source, the oxygen gas may be generated by electric discharge in a gas containing an oxygen gas supplied from an oxygen source holding oxygen as a main component. In the step of restoring nitrogen oxide adsorbability of the first adsorbent, the oxygen gas may be supplied as the purge gas from the oxygen source.

In this manner, since the oxygen source as a source of a raw material of the ozone gas can also be used as a source of the purge gas, facilities can be simplified. In the present application, the gas containing the oxygen gas as a main component refers to a gas containing an oxygen gas of 80% by volume or more.

In the method for supplying an ozone gas according to the first aspect, in the step of supplying the ozone gas from the ozone gas source to the object through the second channel and the step of supplying the ozone gas from the ozone gas source to the object through the first channel, the ozone gas that has flowed in the first vessel disposed on the first channel or the second channel may flow into a buffer vessel so that a concentration is leveled, and then, the ozone gas may be supplied to the object. In this manner, the ozone gas of a stable concentration can be supplied to the object.

The system for supplying an ozone gas according to the first aspect of the present invention includes: an ozone gas source that supplies an ozone gas containing a nitrogen oxide; a first channel in which the ozone gas from the ozone gas source is conveyed to an object; a second channel in which the ozone gas from the ozone gas source is conveyed to the object; and a control section that controls a supply path of the ozone gas from the ozone gas source to the object. The first channel is provided with a first vessel that holds a first adsorbent of silica gel.

The control section switches the ozone gas from the ozone gas source between a state where the ozone gas from the ozone gas source is supplied to the object through the second channel, and a state where the ozone gas from the ozone gas source is supplied to the object through the first channel provided with the first vessel so that the nitrogen oxide is adsorbed on the first adsorbent and the ozone gas having a reduced concentration of the nitrogen oxide is supplied to the object. The state where the ozone gas from the ozone gas source is supplied to the object through the second channel includes a state where while the ozone gas from the ozone gas source is supplied to the object through the second channel, a part of the ozone gas from the ozone gas source is introduced into the first vessel so that the ozone gas is adsorbed on the first adsorbent and ozone adsorbability of the first adsorbent is reduced. The control section switches the ozone gas from the ozone gas source to the state where the ozone gas from the ozone gas source is supplied to the object through the first channel in a state where the first vessel holds the first adsorbent whose ozone adsorbability is reduced by introducing a part of the ozone gas from the ozone gas source to the first vessel.

The use of the system for supplying an ozone gas according to the present invention can implement the method for supplying an ozone gas according to the first aspect of the present invention. Consequently, with the system for supplying an ozone gas according to the first aspect of the present invention, the ozone gas from which the nitrogen oxide is removed can be supplied at a stable concentration.

The system for supplying an ozone gas may further include a detector that detects a timing of a rise of a concentration of the nitrogen oxide contained in the ozone gas from the ozone gas source and outputs nitrogen oxide concentration rise information noticing in advance a rise of the concentration of the nitrogen oxide contained in the ozone gas. Based on the nitrogen oxide concentration rise information, the control section may switch the ozone gas to the state where the ozone gas is supplied to the object through the first channel. In this manner, the ozone gas can be switched to the state where the nitrogen oxide is adsorbed on the first vessel at an appropriate timing.

In the system for supplying an ozone gas according to the first aspect, the ozone gas source includes an electrode configured to generate an ozone gas by electric discharge in a gas containing an oxygen gas as a main component. The detector may detect a timing when the electrode is heated to a temperature greater than or equal to a temperature at which dinitrogen pentoxide is vaporized as the timing of the rise of the concentration of the nitrogen oxide.

By switching the ozone gas to the state where the ozone gas is supplied to the object through the first channel using information on the timing of heating the electrode as the nitrogen oxide concentration rise information, the nitrogen oxide is adsorbed on the first adsorbent, and the ozone gas having a reduced concentration of the nitrogen oxide can be supplied to the object.

The system for supplying an ozone gas according to the first aspect may further include: a purge gas inflow channel connected to the first vessel; a heating unit that heats the first adsorbent; and a purge gas emission channel connected to the first vessel. With this configuration, while the first adsorbent in the first vessel is heated by the heating unit, the purge gas is introduced into the first vessel so that the nitrogen oxide adsorbed on the first adsorbent is separated and is emitted out of the first vessel with the purge gas. Accordingly, nitrogen oxide adsorbability of the first adsorbent can be restored.

The system for supplying an ozone gas according to the first aspect may further include an oxygen source connected to the ozone gas source. The ozone gas source may generate an ozone gas by electric discharge in a gas containing an oxygen gas supplied from the oxygen source as a main component. The oxygen source may be connected to the purge gas inflow channel With this configuration, since the oxygen source that supplies oxygen as a raw material of the ozone gas can also be used as a source of the purge gas, facilities can be simplified.

In the system for supplying an ozone gas according to the first aspect, the first channel may include a junction region that is disposed downstream of the first vessel and merges with the second channel. The junction region may be provided with a buffer vessel configured to level a concentration of the ozone gas. In this manner, the ozone gas of a stable concentration can be supplied to the object.

A method for removing a nitrogen oxide according to a second aspect of the present invention is a method for removing a nitrogen oxide from an ozone gas containing the nitrogen oxide. The method for removing a nitrogen oxide includes the steps of: introducing an ozone gas from an ozone gas source for supplying an ozone gas containing a nitrogen oxide into a first vessel holding a first adsorbent of silica gel so that the nitrogen oxide is adsorbed on the first adsorbent and ejecting the ozone gas having a reduced concentration of the nitrogen oxide from the first vessel; while heating the first adsorbent in the first vessel on which the nitrogen oxide is adsorbed, introducing a purge gas into the first vessel to separate the nitrogen oxide adsorbed on the first adsorbent and thereby emit the ozone gas out of the first vessel with the purge gas so that nitrogen oxide adsorbability of the first adsorbent is restored, and introducing an ozone gas from the ozone gas source into a second vessel holding a second adsorbent of silica gel so that the nitrogen oxide is adsorbed on the second adsorbent and the ozone gas having a reduced concentration of the nitrogen oxide is ejected from the second vessel; while introducing an ozone gas from the ozone gas source into a third vessel holding a third adsorbent of silica gel to cause the nitrogen oxide to be adsorbed on the third adsorbent and eject the ozone gas having a reduced concentration of the nitrogen oxide from the third vessel, introducing an ozone gas from the ozone gas source into the first vessel to cause the ozone gas to be adsorbed on the first adsorbent having restored nitrogen oxide adsorbability and thereby reduce ozone adsorbability of the first adsorbent; and introducing an ozone gas from the ozone gas source into the first vessel to cause the nitrogen oxide to be adsorbed on the first adsorbent having restored nitrogen oxide adsorbability and reduced ozone adsorbability and thereby eject the ozone gas having a reduced concentration of the nitrogen oxide from the first vessel.

In the method for removing a nitrogen oxide according to the second aspect of the present invention, the ozone gas is introduced into the first vessel so that the nitrogen oxide is adsorbed on the first adsorbent, and the ozone gas having a reduced concentration of the nitrogen oxide is ejected from the first vessel. Then, before the nitrogen oxide adsorbability of the first adsorbent decreases across a tolerance, the flow of the ozone gas into the first vessel is stopped and the ozone gas is introduced into the second vessel so that the nitrogen oxide is adsorbed on the second adsorbent, and the ozone gas having a reduced concentration of nitrogen oxide is ejected from the second vessel. On the other hand, with respect to the first vessel for which the inflow of the ozone gas is stopped, a purge gas is introduced into the first vessel with the first adsorbent heated so that the nitrogen oxide adsorbed on the first vessel is separated and thereby nitrogen oxide adsorbability of the first adsorbent is restored. In this manner, removal of nitrogen oxide in the first vessel can be performed again. Then, the ozone gas is introduced into the first vessel again, and the ozone gas having a recued nitrogen oxide concentration is ejected from the first vessel. In this manner, the ozone gas can be continuously supplied.

In addition, before the nitrogen oxide is removed again in the first vessel, the ozone gas is introduced into the third vessel so that the nitrogen oxide is adsorbed on the third adsorbent. While the ozone gas having a reduced concentration of the nitrogen oxide is ejected from the third vessel, the ozone gas is introduced into the first vessel so that the ozone gas is adsorbed on the first adsorbent having restored nitrogen oxide adsorbability, and thereby, ozone adsorbability of the first adsorbent is reduced. In this manner, in removing the nitrogen oxide in the ozone gas by introducing the ozone gas again into the first vessel holding the first adsorbent having restored nitrogen oxide adsorbability, since the ozone adsorbability of the first adsorbent is reduced, a decrease of the concentration of the ozone gas ejected from the first vessel can be reduced. Here, the third adsorbent and the third vessel may be respectively the same as the second adsorbent and the second vessel, or may be an adsorbent of silica gel different from the second adsorbent and a vessel holding this adsorbent and different from the second vessel. The flow rate of the ozone gas introduced into the first vessel may be 10% or less, and more preferably 5% or less, of the flow rate of the ozone gas introduced into the third vessel. In this manner, variations of the flow rate of ozone from which the nitrogen oxide is removed can be easily reduced. In the manner described above, with the method for removing a nitrogen oxide according to the second aspect of the present invention, ozone gas from which the nitrogen oxide is removed can be continuously supplied at a stable concentration.

The method for supplying an ozone gas according to the second aspect of the present invention includes the steps of: preparing an ozone gas containing a nitrogen oxide; removing the nitrogen oxide from the ozone gas; and supplying the ozone gas from which the nitrogen oxide is removed. In the step of removing nitrogen oxide, nitrogen oxide is removed by the method for removing nitrogen oxide described above. With the method for supplying an ozone gas according to the second aspect of the present invention, since the nitrogen oxide in the ozone gas is removed by the method for removing a nitrogen oxide according to the second aspect of the present invention, the ozone gas from which the nitrogen oxide is removed can be supplied to at a stable concentration.

In the method for supplying an ozone gas according to the second aspect, in the step of preparing the ozone gas, the ozone gas is prepared by electric discharge in a gas supplied from an oxygen source holding oxygen and containing an oxygen gas as a main component, and in the step of removing a nitrogen oxide from the ozone gas, an oxygen gas may be supplied as a purge gas from the oxygen source. In this manner, since the oxygen source as a source of a raw material of the ozone gas can also be used as a source of the purge gas, facilities can be simplified.

An ozone gas supply apparatus according to the second aspect of the present invention includes: an ozone generator that is connected to an oxygen source holding oxygen and generates an ozone gas containing a nitrogen oxide by electric discharge in a gas containing an oxygen gas supplied from the oxygen source as a main component; a first vessel holding a first adsorbent of silica gel; a second vessel holding a second adsorbent of silica gel; a first ozone gas pipe connected to the first vessel and defining a channel of an ozone gas flowing from the ozone generator into the first vessel; a second ozone gas pipe connected to the second vessel and defining a channel of an ozone gas flowing into the second vessel from the ozone generator; a first ozone gas valve disposed on the first ozone gas pipe; and a second ozone gas valve disposed on the second ozone gas pipe. The ozone gas supply apparatus according to the present invention includes: a first purge gas pipe connected to the first vessel and defining a channel of a purge gas flowing into the first vessel; a second purge gas pipe connected to the second vessel and defining a channel of a purge gas flowing into the second vessel; a first purge gas valve disposed on the first purge gas pipe; a second purge gas valve disposed on the second purge gas pipe; a first outflow pipe connected to the first vessel and defining a channel of a gas flowing out of the first vessel; a second outflow pipe connected to the second vessel and defining a channel of a gas flowing out of the second vessel; a first heating unit for heating the inside of the first vessel; a second heating unit for heating the inside of the second vessel; and a purging oxygen gas pipe defining a channel of an oxygen gas flowing as a purge gas from the oxygen source into the first purge gas pipe and the second purge gas pipe.

The use of the ozone gas supply apparatus according to the second aspect of the present invention can implement the method for removing a nitrogen oxide according to the second aspect of the present invention. Consequently, the ozone gas supply apparatus according to the second aspect of the present invention can continuously supply the ozone gas from which the nitrogen oxide is removed at a stable concentration. The ozone gas supply apparatus according to the second aspect of the present invention includes a purging oxygen gas pipe defining a channel of an oxygen gas flowing as a purge as from the oxygen source into the first purge gas pipe and the second purge gas pipe. In this manner, since the oxygen source as a source of a raw material of the ozone gas can also be used as a source of the purge gas, facilities can be simplified.

The ozone gas supply apparatus according to the second aspect may further include a control section that is connected to a first ozone gas valve, a second ozone gas valve, a first purge gas valve, and a second purge gas valve and controls opening and closing of the first ozone gas valve, the second ozone gas valve, the first purge gas valve, and the second purge gas valve. In this manner, the control section can perform opening and closing operations of the first ozone gas valve, the second ozone gas valve, the first purge gas valve, and the second purge gas valve for performing introduction, into a vessel, of the ozone gas for removing a nitrogen oxide from the ozone gas supplied from the ozone generator and introduction of a purge gas into a vessel for restoring nitrogen oxide adsorbability of the adsorbent.

In the ozone gas supply apparatus according to the second aspect, the control section may include an adsorption state determining section for determining a state of adsorption of the nitrogen oxide on silica gel. In this manner, the timings of inflow and outflow of the ozone gas and the purge gas can be appropriately controlled.

The ozone gas supply apparatus according to the second aspect may further include: a first cooling section for cooling the inside of the first vessel; and a second cooling section for cooling the inside of the second vessel. In this manner, cooling the inside of the vessel heated for separating the nitrogen oxide from the adsorbent can be efficiently performed, and the step of causing the nitrogen oxide in the introduced ozone gas to be adsorbed on the adsorbent can be performed at low temperatures.

Oxygen produced by a general process contains nitrogen as an impurity. Thus, through electric discharge in a gas containing such an oxygen gas as a main component, an ozone gas containing a nitrogen oxide is generated. In the generation of the ozone gas through electric discharge, a nitrogen gas is intentionally added to the oxygen gas as described above so that the concentration and stability with time of the ozone gas can be enhanced. Through electric discharge in such a mixture gas (gas containing an oxygen gas as a main component), an ozone gas containing a nitrogen oxide is also generated. In the latter case, not only an oxygen source but also a nitrogen source holding nitrogen is connected to the ozone gas source. In the former case, the oxygen source is connected but no nitrogen source is connected to the ozone gas source. In either case, an ozone gas containing a nitrogen oxide is generated in the ozone gas source.

The first aspect and the second aspect of the present invention can be performed in combination when necessary.

Effects of Invention

As clearly described above, with the method for supplying an ozone gas and the system for supplying an ozone gas according to the first aspect of the present invention, a method and a system for supplying an ozone gas that can supply an ozone gas from which a nitrogen oxide is removed at a stable concentration can be provided. With the method for removing a nitrogen oxide, the method for supplying an ozone gas, and the ozone gas supply apparatus according to the second aspect of the present invention, an ozone gas from which a nitrogen oxide is removed can be continuously supplied at a stable concentration.

DESCRIPTION OF EMBODIMENTS

Figure 1:
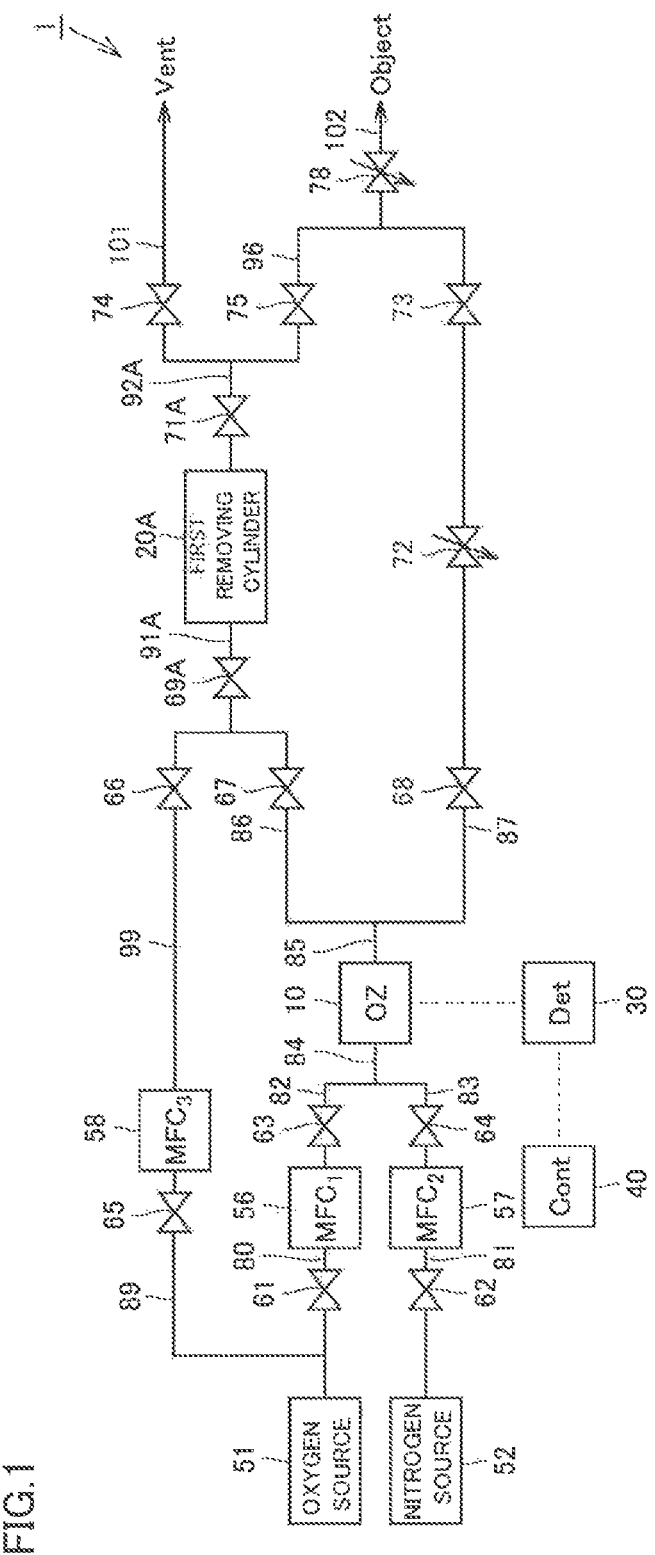
FIG. 1 is a schematic drawing illustrating an example configuration of an ozone gas supply system according to a first embodiment.

Embodiments of the present invention will be described hereinafter with reference to the drawings. In the following drawings, the same or corresponding parts are denoted by the same reference numerals, and the description thereof will not be repeated.

First Embodiment

1. Configuration of Ozone Gas Supply System

With reference to FIG. 1, an ozone supply system 1 that is a system for supplying an ozone gas according to a first embodiment includes an ozone generating device 10 serving as an ozone gas source, an ozone concentration detector 30 connected to the ozone generating device 10, and a control section 40 connected to the ozone concentration detector 30.

The ozone concentration detector 30 detects a concentration of ozone generated in the ozone generating device 10. If an anomaly is detected in the concentration, the ozone concentration detector 30 outputs a concentration anomaly signal to the control section 40. If the control section 40 receives the concentration anomaly signal, the control section 40 determines that dinitrogen pentoxide in an amount exceeding a tolerance is attached to an electrode in the ozone generating device 10, and controls the ozone generating device 10 to remove the attached dinitrogen pentoxide and also controls a supply path of an ozone gas from the ozone generating device 10 to an object. When the dinitrogen pentoxide attached to the electrode is removed, the concentration of a nitrogen oxide ejected from the ozone generating device 10 increases. Thus, the concentration anomaly signal is nitrogen oxide concentration rise information noticing in advance a rise of the concentration of the nitrogen oxide contained in the ozone gas.

The ozone supply system 1 further includes an oxygen source 51, a nitrogen source 52, a first mass flow controller 56 as a first flow rate adjuster, a second mass flow controller 57 as a second flow rate adjuster, a third mass flow controller 58 as a third flow rate adjuster, and a first removing cylinder 20A as a first vessel. As the oxygen source 51 and the nitrogen source 52, a liquid gas container (LGC) and a cold evaporator (CE) for holding oxygen and nitrogen, respectively, can be employed, for example. The oxygen source 51 and the first mass flow controller 56 are connected to each other by a pipe 80. The pipe 80 is an outflow channel of an oxygen gas from the oxygen source 51. The pipe 80 is provided with a valve 61. The nitrogen source 52 and the second mass flow controller 57 are connected to each other by a pipe 81. The pipe 81 is provided with a valve 62. The first mass flow controller 56 is connected to a pipe 82. The pipe 82 is provided with a valve 63. The second mass flow controller 57 is connected to a pipe 83. The pipe 83 is provided with a valve 64. The pipe 82 and the pipe 83 are connected to a pipe 84. The pipe 84 is connected to the ozone generating device 10. The pipe 84 is an inflow channel of a source gas to the ozone generating device 10. In this manner, the oxygen source 51 and the nitrogen source 52 are connected to the ozone generating device 10 through the pipes.

The ozone generating device 10 is connected to a pipe 85. The pipe 85 is an outflow channel of an ozone gas generated in the ozone generating device 10. The pipe 85 is connected to a pipe 86 and a pipe 87. The pipe 86 is provided with a valve 67. A pipe 89 is connected between a position at which the valve 61 is disposed on the pipe 80 and a position at which the pipe 80 connected to the oxygen source 51. The pipe 89 is connected to the third mass flow controller 58. The pipe 89 is provided with a valve 65. The third mass flow controller 58 is connected to a pipe 99. The pipe 99 is provided with a valve 66. The pipe 99 and the pipe 86 are connected to a pipe 91A. The pipe 91A is provided with a valve 69A. The pipe 91A is connected to the first removing cylinder 20A. The pipe 91A is an inflow channel of an ozone gas and an oxygen gas serving as a purge gas to the first removing cylinder 20A. The pipes 80, 89, 99, and 91A constitute a purge gas inflow channel. The first removing cylinder 20A is connected to a pipe 92A. The pipe 92A is an outflow channel of an ozone gas and an oxygen gas serving as a purge gas from the first removing cylinder 20A. The pipe 92A is provided with a valve 71A. In this manner, a configuration in which the oxygen source 51 holding an oxygen gas as a row material of an ozone gas can also be used as a source of a purge gas is employed, and thereby, facilities can be simplified.

The pipe 92A is connected to a pipe 101 and a pipe 96. The pipe 101 is provided with a valve 74. The pipe 101 is connected to an exhaust part. The pipe 101 is an exhaust pipe for emitting an unnecessary gas from the ozone supply system 1. The pipe 96 is provided with a valve 75. The pipe 96 is connected to a pipe 102. The pipe 102 is provided with a valve 78. The pipe 102 is connected to an ejection part that ejects an ozone gas to an object to which the ozone gas is to be supplied. The pipe 102 is a supply pipe from which the ozone gas from the ozone supply system 1 is ejected to the object. The pipe 87 is connected to the pipe 102. On the pipe 87, a valve 68, a valve 72, and a valve 73 are arranged in this order from the side close to the pipe 85. The pipes 92A and 101 constitute a purge gas emission channel. The pipes 85, 86, 91A, 92A, 96, and 102 constitute a first channel. The pipes 85, 87, and 102 constitute a second channel.

Figure 2:
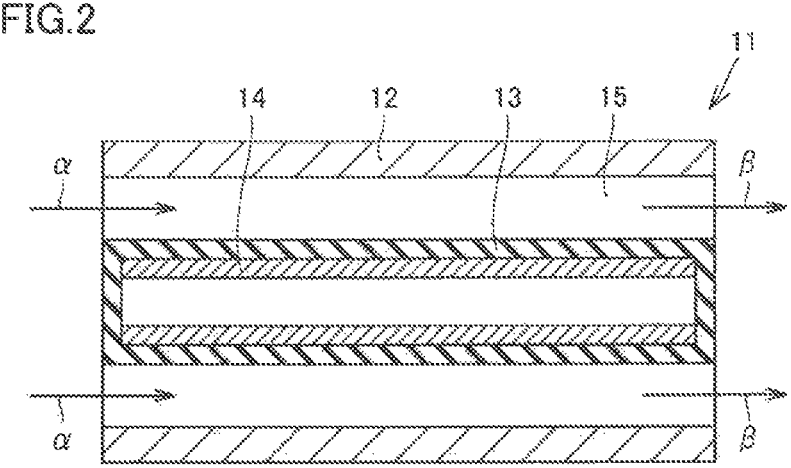
FIG. 2 is a schematic cross-sectional view illustrating a configuration of a discharge unit included in an ozone generating device.

Next, a configuration of the ozone generating device 10 will be described. The ozone generating device 10 includes a plurality of discharge units. In the ozone generating device 10, the plurality of discharge units are arranged in parallel. With reference to FIG. 2, each discharge unit 11 includes a first electrode 12, a second electrode 14, and a dielectric tube 13. The first electrode 12 is composed of a conductive material and has a hollow cylindrical shape whose both ends are open. The second electrode 14 is composed of a conductive material and has a hollow cylindrical shape whose diameter is smaller than that of the first electrode 12. The dielectric tube 13 is composed of, for example, glass and has a hollow cylindrical shape whose both ends are closed.

The first electrode 12, the second electrode 14, and the dielectric tube 13 are so arranged that center axes thereof coincide with one another. The second electrode 14 and the dielectric tube 13 are disposed in such a manner that the inner peripheral surface of the dielectric tube 13 and the outer peripheral surface of the second electrode 14 are in contact each other in the entire area. A wall at one end of the dielectric tube 13 is in contact with a surface at one end of the second electrode 14. A wall at the other end of the dielectric tube 13 is in contact with a surface at the other end of the second electrode 14. That is, the dielectric tube 13 is so disposed as to contact the second electrode 14 and surround the second electrode 14. The outer peripheral surface of the dielectric tube 13 faces the inner peripheral surface of the first electrode 12.

A space sandwiched between the outer peripheral surface of the dielectric tube 13 and the inner peripheral surface of the first electrode 12 is a discharge space 15. When a voltage is applied across the first electrode 12 and the second electrode 14, electric discharge occurs in the discharge space 15. At this time, a source gas containing an oxygen gas as a main component and containing a nitrogen gas flows along arrows α. The oxygen gas contained in the source gas is ozonized by electric discharge between the first electrode 12 and the second electrode 14, and an ozone gas is ejected along arrows β. In this manner, the oxygen gas that has flowed into the discharge unit 11 is ionized, and the ozone gas is ejected from the discharge unit 11.

Next, a configuration of the first removing cylinder 20A will be described. The first removing cylinder 20A has a configuration similar to that of the removing cylinder 20 illustrated in FIG. 3. The removing cylinder 20 includes a body 21, a ribbon heater 22 as a heating unit, a jacket 23, and a temperature sensor 24. The body 21 has a cylindrical shape. In the body 21, an adsorbent holding part 28 that is a cylindrical hollow region is formed. The adsorbent holding part 28 holds an adsorbent 29 (first adsorbent) of silica gel therein. Silica gel constituting the adsorbent 29 is adjusted to have a purity of 99.99% by mass or more. An end of the adsorbent holding part 28 is connected to a pipe 91. The other end of the adsorbent holding part 28 is connected to a pipe 92. The pipe 91 and the pipe 92 respectively correspond to the pipe 91A and the pipe 92A in FIG. 1.

The ribbon heater 22 is disposed to surround the outer periphery of the body 21. The ribbon heater 22 is connected to a heating power supply (not shown), and heats the first adsorbent 29 in the adsorbent holding part 28 to an intended temperature by heating the body 21. The jacket 23 is disposed to surround the outer periphery of the ribbon heater 22. By mounting the jacket 23, the temperature of the removing cylinder 20 is maintained, and when the removing cylinder 20 is heated, influence of the temperature of the removing cylinder 20 on temperature of other members adjacent to the removing cylinder 20 can be reduced. The temperature sensor 24 is disposed in the body 21.

The temperature sensor 24 measures a temperature of the first adsorbent 29 in the adsorbent holding part 28. The temperature sensor 24 and the heating power supply are connected to the control section 40. Based on information on the temperature of the first adsorbent 29 obtained from the temperature sensor 24, the control section 40 controls the heating power supply so as to keep the first adsorbent 29 at an intended temperature.

2. Method for Supplying Ozone Gas

Figure 3:
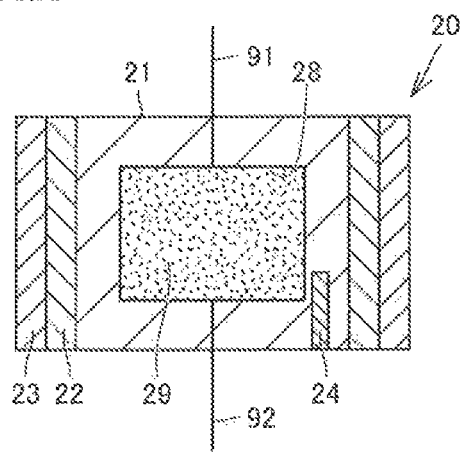
FIG. 3 is a schematic cross-sectional view illustrating a configuration of a removing cylinder.
Figure 4:
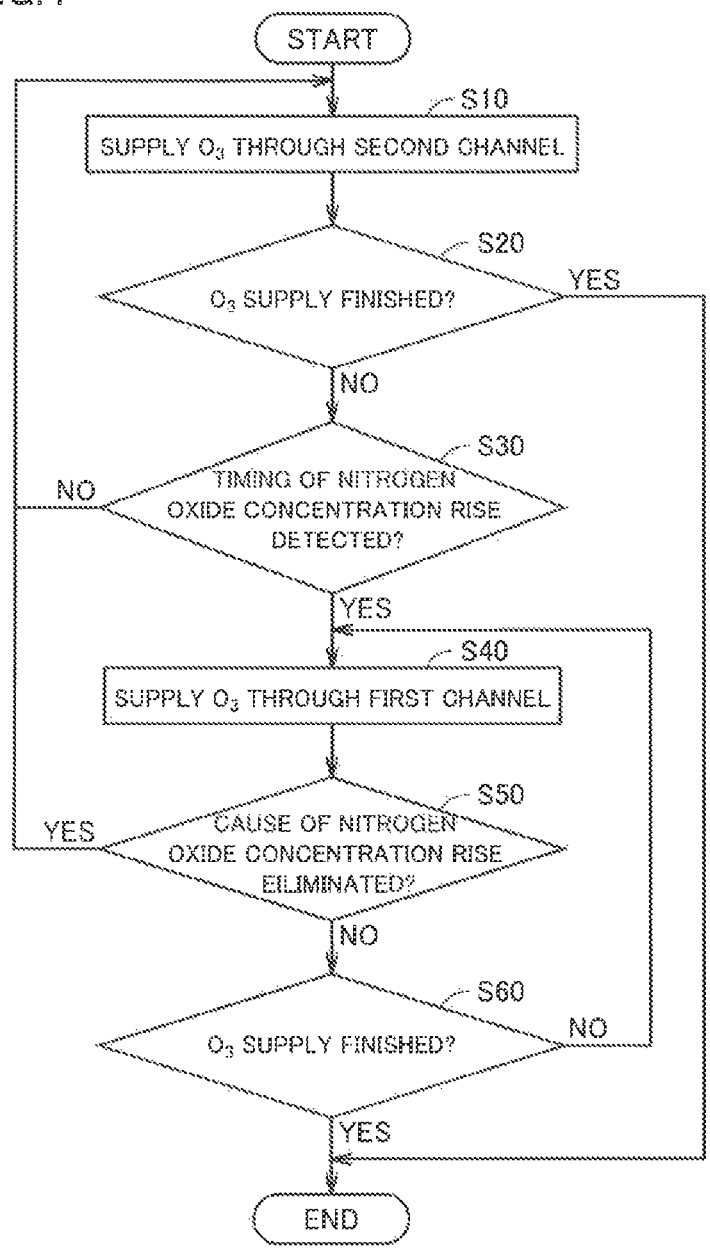
FIG. 4 is a flowchart depicting an example of control of a supply path of an ozone gas in the first embodiment.
Figure 5:
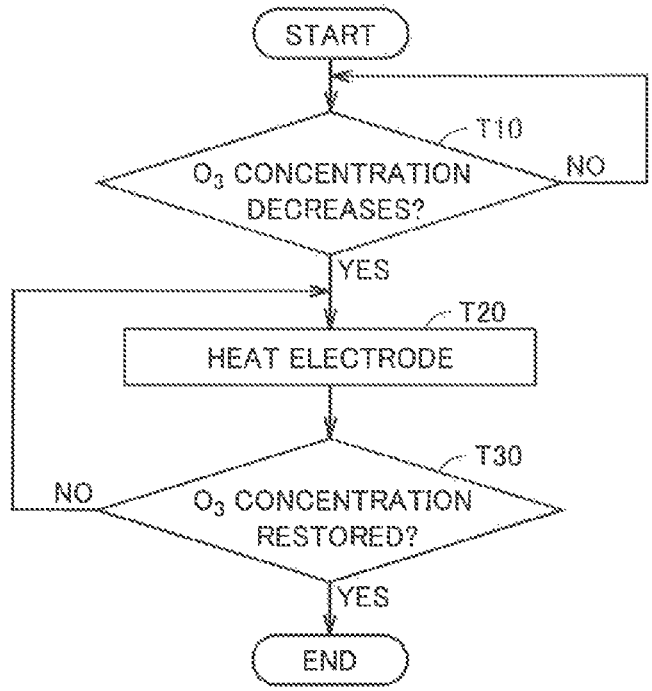
FIG. 5 is a flowchart depicting an example of control of the ozone generating device.
Figure 6:
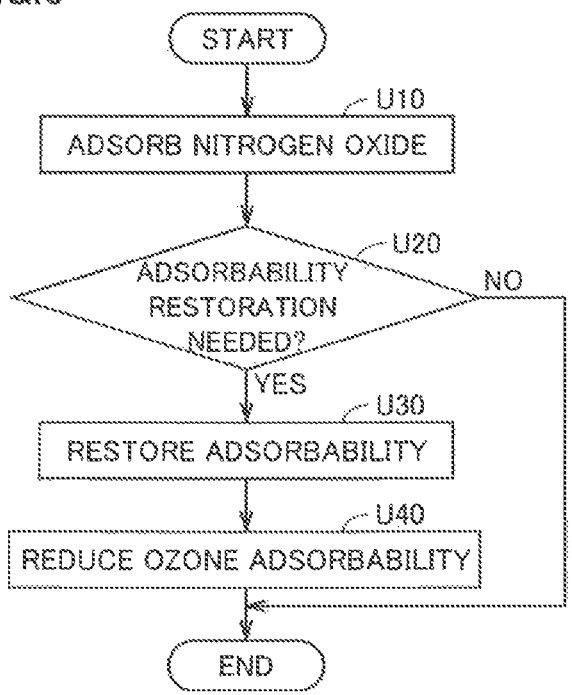
FIG. 6 is a flowchart depicting an example of control of the removing cylinder.
Figure 7:
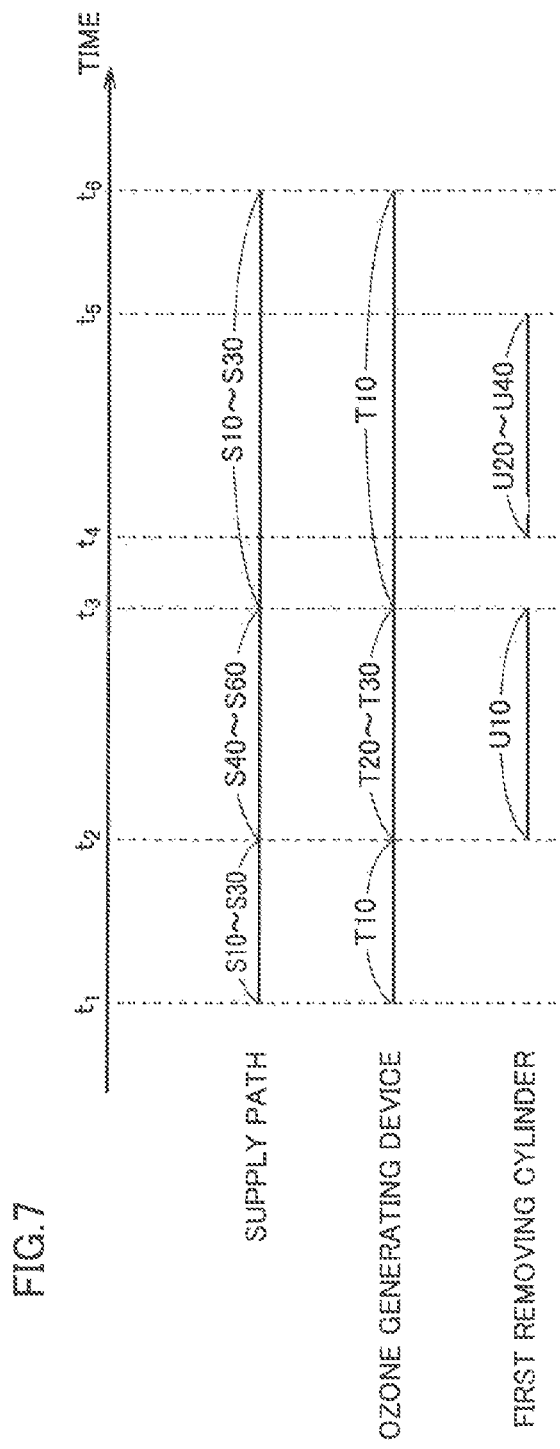
FIG. 7 is a timing chart showing an example procedure of supplying an ozone gas in the first embodiment.

With reference now to FIGS. 1 through 7, a method for supplying an ozone gas according to the first embodiment of the present invention will be described. FIG. 4 is a flowchart depicting an example of control of a supply path of an ozone gas in the first embodiment. FIG. 5 is a flowchart depicting an example of control of the ozone generating device. FIG. 6 is a flowchart depicting an example of control of the removing cylinder. FIG. 7 is a timing chart showing an example procedure of supplying an ozone gas in the first embodiment.

(1) Time $t_1$ Through $t_2$

With reference to FIG. 7, in time $t_1$ through $t_2$, steps S10 through S30 are repeated in control of the supply path of an ozone gas, and step T10 is performed in the ozone generating device. The first removing cylinder is in a standby state.

Specifically, with reference to FIG. 4, in the control of the supply path of an ozone gas, first, the step of supplying an ozone gas from the ozone generating device 10 to an object through the second channel is performed as step S10. In step S10, with reference to FIG. 1, control by the control section 40 opens the valves 61 through 64, 68, 72, 73, and 78 and closes the other valves. An oxygen gas supplied from the oxygen source 51 through the pipe 80 is subjected to flow rate adjustment in the first mass flow controller 56, and reaches the pipe 84 through the pipe 82. A nitrogen gas supplied from the nitrogen source 52 through the pipe 81 is subjected to flow rate adjustment in the second mass flow controller 57, and reaches the pipe 84 through the pipe 83. Consequently, a source gas in which an intended proportion of the nitrogen gas is mixed in the oxygen gas (e.g., a mixture gas containing several percentages by volume of the nitrogen gas and containing the oxygen gas as the remainder) is supplied to the ozone generating device 10 through the pipe 84. With reference to FIG. 2, the source gas that has reached the ozone generating device 10 flows into the discharge space 15 along the arrows α. At this time, an ozone gas is generated by electric discharge between the first electrode 12 and the second electrode 14. The generated ozone gas is ejected from the discharge space 15 along the arrows β. With reference to FIG. 1, the ejected ozone gas is supplied to the object through the pipes 85, 87, and 102 constituting the second channel.

With reference to FIG. 4, if the supply of the ozone gas to the object is finished (YES in step S20), the operation of the ozone supply system 1 is stopped so that the supply of the ozone gas is finished. If the supply of the ozone gas to the object is not finished (No in step S20), it is determined whether nitrogen oxide concentration rise information that is information on the timing of a rise of the concentration of a nitrogen oxide contained in the ozone gas from the ozone generating device 10 is detected or not (step S30). Specifically, with reference to FIGS. 5 and 1, the ozone concentration detector 30 detects a concentration of ozone generated in the ozone generating device 10, and determines whether the concentration is anomalous or not. For example, the ozone concentration detector 30 determines whether the ozone concentration is below a predetermined concentration range or not (step T10). If the ozone concentration is within the predetermined concentration range (NO in step T10), it is determined that the timing of a rise of the concentration of the nitrogen oxide is not detected (NO in step S30), and the ozone gas continues to be supplied to the object through the second channel. The ozone concentration detector 30 continues to detect the concentration of ozone generated in the ozone generating device 10. In time $t_1$ through $t_2$, steps S10 through S30 are repeatedly performed as described above, and step T10 is repeatedly performed. The first removing cylinder 20A disposed in the first channel is in a standby state.

(2) Time $t_2$ Through $t_3$

With reference to FIG. 7, in time $t_2$ through $t_3$, steps S40 through S60 are repeated in control of the supply path of the ozone gas. In the ozone generating device, steps T20 through T30 are repeated. In the first removing cylinder, step U10 is performed.

With reference to FIGS. 1, 4, and 5, at time $t_2$, if the ozone concentration detector 30 detects that the concentration of the ozone gas becomes out of the predetermined concentration range, for example, that the concentration of the ozone gas decreases below the predetermined concentration range (YES in step T10), it is assumed that dinitrogen pentoxide is attached to the electrodes of the ozone generating device 10 (see FIG. 2) to reduce an ozone generation efficiency. Thus, the electrodes are heated so that dinitrogen pentoxide is removed (step T20). When the electrodes are heated, the concentration of a nitrogen oxide contained in the generated ozone gas increases. Thus, information on the degrease of the ozone gas concentration is nitrogen oxide concentration rise information that is information on the timing of a rise of the concentration of the nitrogen oxide contained in the ozone gas from the ozone generating device 10 as the ozone gas source.

The ozone concentration detector 30 outputs the nitrogen oxide concentration rise information, and the control section 40 detects this information (YES in step S30). Based on the nitrogen oxide concentration rise information, the control section 40 switches the ozone gas from the ozone generating device 10 to a state where the ozone gas is supplied to the object through the first channel (step S40). Specifically, with reference to FIG. 1, the valves 68, 72, and 73 are closed and the valves 67, 69A, 71A, and 75 are opened. The other valves are kept in the same states as those in step S10. In this manner, with reference to FIG. 1, the ozone gas ejected from the ozone generating device 10 is supplied to the object through the pipes 85, 86, 91A, 92A, 96, and 102 constituting the first channel.

The removal of dinitrogen pentoxide by heating the electrodes (step T20) is performed at the same time as or after start of supply of the ozone gas through the first channel (step S40). Step T20 can be performed by heating the electrodes (the first electrode 12 and the second electrode 14) to a temperature greater than or equal to a temperature at which dinitrogen pentoxide is vaporized. The heating of the electrodes can be performed by increasing a voltage between the first electrode 12 and the second electrode 14 and/or by increasing a current between the first electrode 12 and the second electrode 14. The heating of the electrodes changes an ozone generation efficiency in the ozone generating device 10 in some cases. In accordance with this change, the composition and/or the flow rate, for example, of a source gas (a gas containing an oxygen gas as a main component) flowing into the ozone generating device 10 may be changed.

In the step of supplying the ozone gas through the first channel (S40), the ozone gas ejected from the ozone generating device 10 flows into the first removing cylinder 20A holding the adsorbent 29 of silica gel. The nitrogen oxide contained in the ozone gas is adsorbed on the adsorbent 29 (first adsorbent), and the ozone gas having a reduced concentration of the nitrogen oxide is ejected from the first removing cylinder 20A (step U10). The ozone gas ejected from the first removing cylinder 20A is then supplied to the object through the pipes 92A, 96, and 102. As described above, although the concentration of the nitrogen oxide contained in the ozone gas increases by performing the step of heating the electrodes (T20), the ozone gas is switched to the state where the ozone gas is supplied through the first channel (step S40), and the ozone gas ejected from the ozone generating device 10 flows into the first removing cylinder 20A so that the nitrogen oxide is adsorbed (step U10). Thus, the ozone gas having a reduced nitrogen oxide concentration is supplied to the object.

With reference to FIGS. 1 and 5, after start of heating of the electrodes of the ozone generating device 10, the ozone concentration detector 30 monitors whether the ozone gas concentration has restored to a range within the predetermined concentration range or not (step T30). If the ozone gas concentration is not within the predetermined concentration range (NO in step T30), the electrodes continue to be heated. With reference to FIGS. 1 and 4, after the start of supply of the ozone gas through the first channel, it is monitored whether a cause of the nitrogen oxide concentration rise has been eliminated or not (step S50). If the heating of the electrodes that is a cause of the nitrogen oxide concentration rise continues (NO in step S50), it is determined whether the supply of the ozone gas to the object is finished or not (step S60). If the supply of the ozone gas to the object is finished (YES in step S60), the operation of the ozone supply system 1 is stopped so that the supply of the ozone gas is finished. If the supply of the ozone gas to the object is not finished (NO in step S60), the supply of the oxygen gas through the first channel continues.

In time $t_2$ through $t_3$, steps S40 through S60 and steps T20 through T30 are repeatedly performed, and step U10 is performed.

(3) Time $t_3$ Through $t_6$

With reference to FIG. 7, in time $t_3$ through $t_6$, steps S10 through S30 are repeated in control of the supply path of the ozone gas. In the ozone generating device, step T10 is repeated. In time $t_4$ through $t_5$, steps U20 through U40 are performed in the removing cylinder.

With reference to FIGS. 1, 4, and 5, at time $t_3$, if the ozone concentration detector 30 detects that the ozone gas concentration is within the predetermined concentration range (YES in step T30), it is assumed that dinitrogen pentoxide attached to the electrodes (see FIG. 2) of the ozone generating device 10 is sufficiently removed. Thus, heating of the electrodes is finished. Thereafter, the process returns to step T10 again, and the ozone concentration is monitored. Subsequently, similarly to time $t_1$ through $t_2$, step T10 is repeatedly performed until time $t_6$.

When the heating of the electrodes that is a cause of the nitrogen oxide concentration rise is finished (YES in step S50), the control section 40 controls the valves so that the ozone gas is switched to the state where the ozone gas from the ozone generating device 10 is supplied to the object through the second channel. Thereafter, similarly to time $t_1$ through $t_2$, steps S10 through S30 are repeatedly performed until time $t_6$.

On the other hand, at time $t_4$ at the same time as or after time $t_3$ and before time $t_6$, in the removing cylinder (first removing cylinder 20A), it is determined whether nitrogen oxide adsorbability of the adsorbent (first adsorbent 29) needs to be restored or not (step U20). If it is determined that sufficient adsorbability remains and restoration is unnecessary in consideration of an operation history of the removing cylinder, for example, (NO in step U20), the removing cylinder is in a standby state. On the other hand, if it is determined that the restoration is necessary in step U20, the step of restoring nitrogen oxide adsorbability of the adsorbent (first adsorbent 29) is performed as step U30. In this step U30, while the first adsorbent 29 of the first removing cylinder 20A is heated, a purge gas is introduced into the first removing cylinder 20A so that the nitrogen oxide adsorbed on the first adsorbent 29 is separated and is emitted from the first removing cylinder 20A with the purge gas. In this manner, nitrogen oxide adsorbability of the first adsorbent 29 can be restored.

Specifically, with reference to FIG. 1, the valves 65, 66, 69A, 71A, and 74 are opened. In this manner, the oxygen gas supplied from the oxygen source 51 reaches the third mass flow controller 58 through the pipes 80 and 89. The oxygen gas adjusted to the intended flow rate in the third mass flow controller 58 flows as a purge gas into the first removing cylinder 20A through the pipes 99 and 91A. With reference to FIG. 3, in step U30, the first adsorbent 29 held in the first removing cylinder 20A is heated by the ribbon heater 22. The temperature of the first adsorbent 29 in heating is monitored by the temperature sensor 24. In this manner, the nitrogen oxide adsorbed on the first adsorbent 29 is separated, and is emitted together with the oxygen gas as the purge gas from the first removing cylinder 20A through pipe 92A. Then, the exhaust gas containing the nitrogen oxide emitted to the pipe 92A is sent to an exhaust part through the pipe 101 as an exhaust pipe. In this manner, nitrogen oxide adsorbability of the first adsorbent 29 is restored, and step U30 is completed.

Next, in the removing cylinder (first removing cylinder 20A), as step U40, the process of reducing ozone adsorbability of the first adsorbent 29 is performed. In this step U40, part of the ozone gas from the ozone generating device 10 is introduced into the first removing cylinder 20A so that the ozone gas is adsorbed on the first adsorbent, and thereby, ozone adsorbability of the first adsorbent is reduced.

Specifically, with reference to FIG. 1, first, the valves 65 and 66 are closed. In this manner, the supply of the oxygen gas as a purge gas to the first removing cylinder 20A is stopped. Thereafter, the valve 67 is opened. In this manner, part of the ozone gas ejected from the ozone generating device 10 flows into the first removing cylinder 20A through the pipes 86 and 91A. The ozone gas that has flowed into the first removing cylinder 20A is adsorbed on the first adsorbent 29. Consequently, ozone adsorbability of the first adsorbent 29 can be reduced. Thereafter, the ozone gas in the first removing cylinder 20A is emitted to an exhaust part through the pipes 92A and 101.

Here, the flow rate of the ozone gas introduced into the first removing cylinder 20A is preferably 10% or less, and more preferably 5% or less, of the flow rate of the ozone gas ejected from the ozone generating device 10. In this manner, variations of the flow rate of the ozone gas supplied to the object can be easily reduced. The ozone gas introduced into the first removing cylinder 20A in step U40 may be supplied to the object through the pipes 96 and 102. That is, the valve 74 may be closed with the valve 75 opened. From the viewpoint of further stabilizing the concentration of the ozone gas supplied to the object, the ozone gas introduced into the first removing cylinder 20A in step U40 as described above is preferably caused to flow through the exhaust part through the pipe 101 and not to be supplied to the object.

With reference to FIG. 7, at time $t_5$ after time $t_4$ and at the same time as or before time $t_6$, step U40 described above is completed. Specifically, with reference to FIG. 1, the valves 67, 69A, 71A, and 74 are closed. In time $t_5$ through $t_6$, the first removing cylinder 20A is in the standby state. That is, similarly to time $t_1$ through $t_2$ described above, in time $t_5$ through $t_6$, steps S10 through S30 are repeatedly performed in control of the supply path of the ozone gas, and step T10 is repeatedly performed in the ozone generating device. The first removing cylinder 20A disposed on the first channel is in a standby state. The time when the ozone concentration detector 30 detects that the ozone gas concentration becomes out of the predetermined concentration range is assumed as time $t_2$, and after time $t_2$, the control described above is repeated.

In the method for supplying an ozone gas according to this embodiment, steps (S10 through S30; time $t_3$ through $t_6$) of supplying the ozone gas from the ozone generating device 10 through the second channel include the step (U40; time $t_4$ through $t_5$) of reducing ozone adsorbability of the first adsorbent in the first removing cylinder 20A disposed on the first channel. In the step (S40 through S60; time $t_2$ through $t_3$) of supplying the ozone gas from the ozone generating device 10 through the first channel, the ozone gas passes through the first removing cylinder 20A that holds the first adsorbent whose ozone adsorbability has been reduced in the step (U40; time $t_4$ through $t_5$) of reducing ozone adsorbability of the first adsorbent. Accordingly, adsorption of the ozone gas on the first adsorbent is reduced so that the concentration of the ozone gas can be stabilized. In the manner described above, with the method for supplying an ozone gas according to this embodiment, an ozone gas from which nitrogen oxide is removed can be supplied to the object at a stable concentration.

In addition, in the method for supplying an ozone gas according to this embodiment, the step of supplying the ozone gas from the ozone generating device 10 through the second channel (S10 through S30; time $t_3$ through $t_6$) further includes the step of restoring nitrogen oxide adsorbability of the first adsorbent 29 by introducing a purge gas into the first removing cylinder 20A while heating the first adsorbent 29 in the first removing cylinder 20A so that the nitrogen oxide adsorbed on the first adsorbent 29 is separated and by emitting the separated nitrogen oxide out of the first removing cylinder 20A with the purge gas (U30; time $t_4$ through $t_5$), before the step of reducing ozone adsorbability of the first adsorbent 29 (U40; time $t_4$ through $t_5$).

After the step of restoring nitrogen oxide adsorbability of the first adsorbent 29 (U30) has been performed, the step of reducing ozone adsorbability of the first adsorbent 29 (U40) is performed so that the ozone gas is switched to the state where the ozone gas is supplied to the object through the first channel while the first adsorbent 29 has sufficient nitrogen oxide adsorbability and has reduced ozone adsorbability.

Step (U40) may be performed at the same time when or after the control section 40 detects nitrogen oxide concentration rise information output by the ozone concentration detector 30.

Second Embodiment

1. Configuration of Ozone Gas Supply System

A system for supplying an ozone gas according to a second embodiment basically has a configuration and advantages similar to those of the first embodiment. The second embodiment, however, is different from the first embodiment in that a vessel for holding an adsorbent is also disposed on a second channel. Aspects different from those in the first embodiment will be described below.

Figure 8:
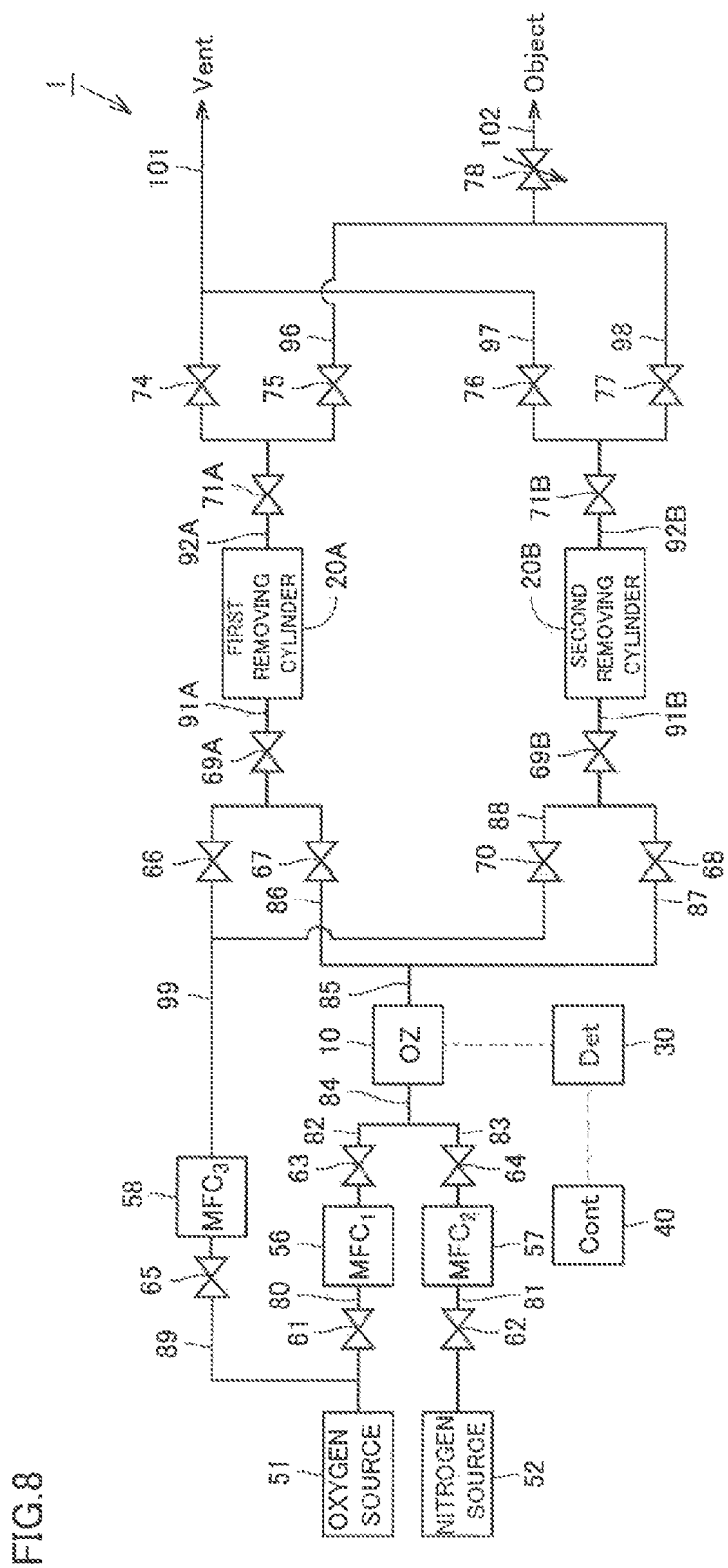
FIG. 8 is a schematic drawing illustrating an example configuration of an ozone gas supply system according to a second embodiment.

With reference to FIG. 8, an ozone supply system 1 according to the second embodiment includes a second removing cylinder 20B as a second vessel.

A pipe 88 is connected between a position at which a valve 66 is disposed on a pipe 99 and a position at which the pipe 99 is connected to a third mass flow controller 58. The pipe 88 is provided with a valve 70. The pipe 88 and a pipe 87 are connected to a pipe 91B. The pipe 91B is provided with a valve 69B. The pipe 91B is connected to a second removing cylinder 20B. The pipe 91B is an inflow channel of an ozone gas and an oxygen gas serving as a purge gas to the second removing cylinder 20B. The pipes 80, 89, 99, 88, and 91B constitute a purge gas inflow channel to the second removing cylinder 20B. The second removing cylinder 20B is connected to a pipe 92B. The pipe 92B is an outflow channel of an ozone gas and an oxygen gas serving as a purge gas from the second removing cylinder 20B. The pipe 92B is provided with a valve 71B. The second removing cylinder 20B has a configuration similar to that of the first removing cylinder 20A and operates in a manner similar to the first removing cylinder 20A.

The pipe 92B is connected to pipes 97 and 98. The pipe 97 is provided with a valve 76. The pipe 97 is connected to a pipe 101 connected to an exhaust part. The pipe 97 is an exhaust pipe for emitting an unnecessary gas from the ozone supply system 1. The pipe 98 is provided with a valve 77. The pipe 98 is connected to a pipe 102. The pipes 92B, 97, and 101 constitute a purge gas emission channel. The pipes 85, 87, 91B, 92B, 98, and 102 constitute a second channel.

2. Method for Supplying Ozone Gas

Figure 9:
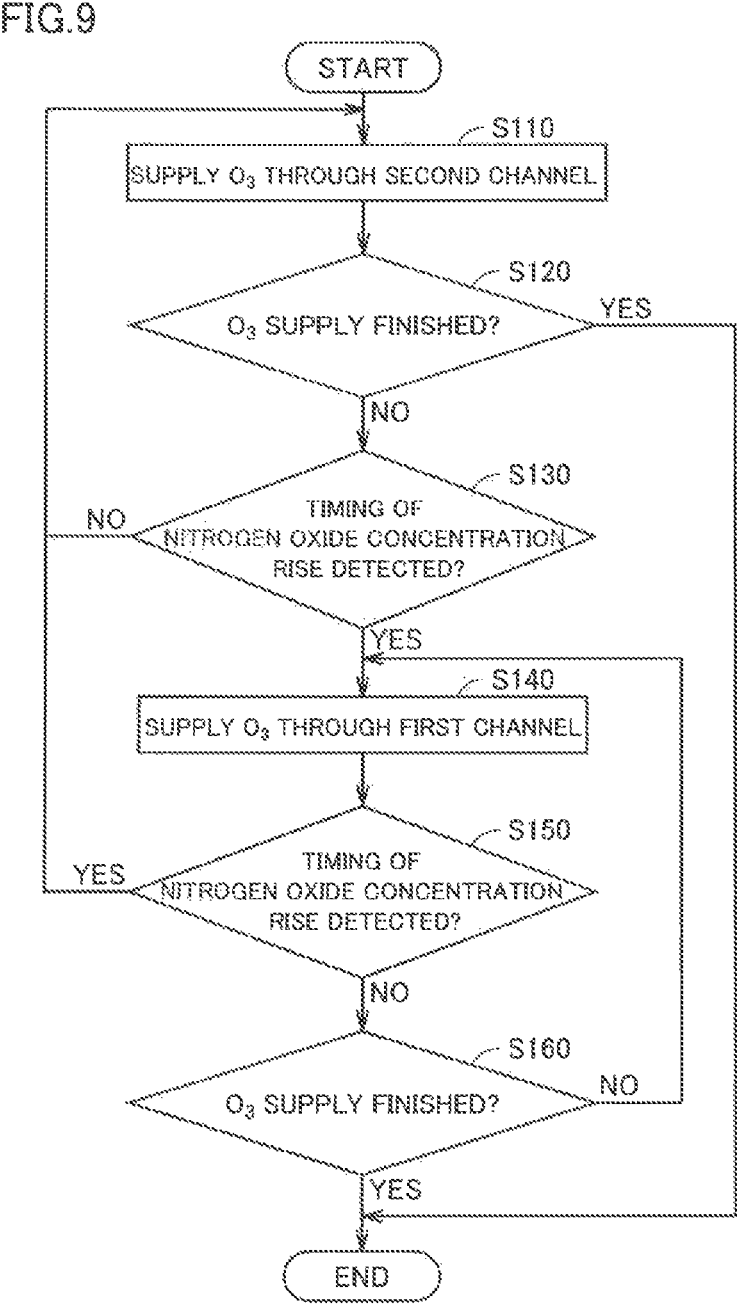
FIG. 9 is a flowchart depicting an example of control of a supply path of an ozone gas in the second embodiment.
Figure 10:
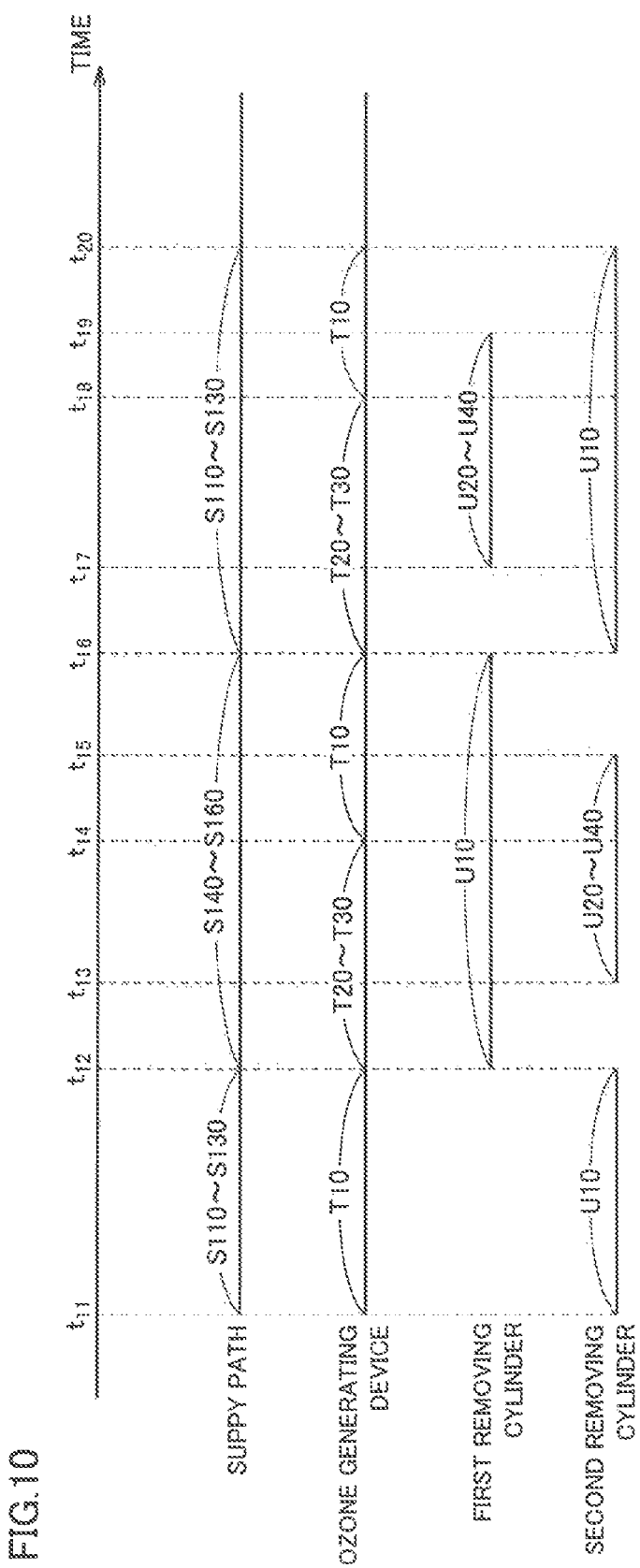
FIG. 10 is a timing chart showing an example procedure of supplying an ozone gas in the second embodiment.

With reference now to FIGS. 8 through 10 and FIGS. 5 and 6, a method for supplying an ozone gas according to the second embodiment of the present invention will be described. FIG. 9 is a flowchart depicting an example of control of a supply path of an ozone gas in the second embodiment. FIG. 10 is a timing chart showing an example procedure of supplying an ozone gas in the second embodiment.

(1) Time $t_{11}$ Through $t_{12}$

With reference to FIG. 10, in time $t_{11}$ through $t_{12}$, steps S110 through S130 are repeated in control of a supply path of an ozone gas, and step T10 is performed in an ozone generating device. The first removing cylinder 20A is in a standby state. In the second removing cylinder 20B, step U10 is performed.

Specifically, with reference to FIG. 9, in the control of the supply path of an ozone gas, first, the step of supplying an ozone gas from the ozone generating device 10 to an object through the second channel is performed as step S110. In step S110, with reference to FIG. 8, control by the control section 40 opens the valves 61 through 64, 68, 69B, 71B, 77, and 78 and closes the other valves. In the ozone generating device 10, an ozone gas is generated in a manner similar to the first embodiment, and is supplied to an object through the pipes 85, 87, 91B, 92B, 98, and 102 constituting a second channel.

With reference now to FIG. 9, if the supply of the ozone gas to the object is finished (YES in step S120), the operation of the ozone supply system 1 is stopped so that the supply of the ozone gas is finished. If the supply of the ozone gas to the object is not finished (No in step S120), it is determined whether nitrogen oxide concentration rise information that is information on the timing of a rise of the concentration of a nitrogen oxide contained in the ozone gas from the ozone generating device 10 is detected or not (step S130) in a manner similar to the first embodiment. If the nitrogen oxide concentration rise information is not detected (NO in step S130), the ozone gas continues to be supplied to the object through the second channel. The ozone concentration detector 30 continues to detect the concentration of ozone generated in the ozone generating device 10.

In time $t_{11}$ through $t_{12}$ in which the ozone gas is supplied to the object through the second channel, the ozone gas ejected from the ozone generating device 10 flows into the second removing cylinder 20B holding an adsorbent 29 of silica gel. The second removing cylinder 20B has a configuration similar to that of the first removing cylinder 20A described with reference to FIG. 3. The nitrogen oxide contained in the ozone gas is adsorbed on the adsorbent 29 (second adsorbent), and the ozone gas having a reduced concentration of the nitrogen oxide is ejected from the second removing cylinder 20B (step U10). The ozone gas ejected from the second removing cylinder 20B is then supplied to the object through the pipes 92B, 98, and 102. In this manner, since the ozone gas ejected from the ozone generating device 10 flows into the second removing cylinder 20B and the nitrogen oxide is adsorbed (step U10), the ozone gas having a reduced nitrogen oxide concentration is supplied to the object.

In time $t_{11}$ through $t_{12}$, steps S110 through S130 are repeatedly performed as described above, and step T10 is repeatedly performed. In the second removing cylinder 20B disposed in the second channel, step U10 is performed.

(2) Time $t_{12}$ Through $t_{16}$

With reference to FIG. 10, in time $t_{12}$ through $t_{16}$, steps S140 through S160 are repeated in control of the supply path of the ozone gas. In the ozone generating device, after steps T20 through T30 are repeated in time $t_{12}$ through $t_{14}$, step T10 is repeatedly performed in time $t_{14}$ through $t_{16}$. In the first removing cylinder, in time $t_{12}$ through $t_{16}$, step U10 is performed. In the second removing cylinder, in time $t_{13}$ through $t_{15}$, steps U20 through U40 are performed.

With reference to FIGS. 8, 9, and 5, at time $t_{12}$, if the ozone concentration detector 30 detects that the ozone gas concentration becomes out of a predetermined concentration range, for example, if the ozone gas concentration decreases below the predetermined concentration range (YES in step T10), in a manner similar to the first embodiment, the ozone concentration detector 30 outputs nitrogen oxide concentration rise information, and the control section 40 detects the information (YES in step S130). Based on the nitrogen oxide concentration rise information, the control section 40 switches the ozone gas from the ozone generating device 10 to a state where the ozone gas is supplied to the object through the first channel (step S140). Specifically, with reference to FIG. 8, the valves 68, 69B, 71B, and 77 are closed and the valves 67, 69A, 71A, and 75 are opened. The other valves are kept in the same states as those in step S110. In this manner, with reference to FIG. 8, the ozone gas ejected from the ozone generating device 10 is supplied to the object through the pipes 85, 86, 91A, 92A, 96, and 102 constituting the first channel.

At the same time as or after start of supply of the ozone gas through the first channel (step S140), electrodes in the ozone generating device 10 are heated so that dinitrogen pentoxide is removed (step T20). The removal of dinitrogen pentoxide by heating the electrodes (step T20) is performed in a manner similar to that of the first embodiment.

In the step of supplying the ozone gas through the first channel (S140), the ozone gas ejected from the ozone generating device 10 flows into the first removing cylinder 20A holding the adsorbent 29 of silica gel. The nitrogen oxide contained in the ozone gas is adsorbed on the adsorbent 29 (first adsorbent), and the ozone gas having a reduced concentration of the nitrogen oxide is ejected from the first removing cylinder 20A (step U10). The ozone gas ejected from the first removing cylinder 20A is then supplied to the object through the pipes 92A, 96, and 102. By performing the step of heating the electrodes (T20) in the manner described above, although the concentration of the nitrogen oxide contained in the ozone gas increases, the ozone gas is switched to the state where the ozone gas is supplied through the first channel (step S140), and the ozone gas ejected from the ozone generating device 10 flows into the first removing cylinder 20A so that the nitrogen oxide is adsorbed (step U10). In this manner, the ozone gas having a reduced nitrogen oxide concentration is supplied to the object.

With reference to FIGS. 8 and 5, after start of heating of the electrodes of the ozone generating device 10, the ozone concentration detector 30 monitors whether the ozone gas concentration has restored to a range within the predetermined concentration range or not (step T30). If the ozone gas concentration is not within the predetermined concentration range (NO in step T30), the electrodes continue to be heated. At time $t_{14}$, if the ozone concentration detector 30 detects that the ozone gas concentration comes to be within the predetermined concentration range (YES in step T30), heating of the electrodes is finished. Thereafter, the process returns to step T10 again, and the ozone concentration is monitored. Subsequently, similarly to time $t_{11}$ through $t_{12}$, step T10 is repeatedly performed until time $t_{16}$.

With reference to FIGS. 8 and 9, after start of supply of the ozone gas through the first channel, it is determined whether nitrogen oxide concentration rise information is detected or not (step S150). If the nitrogen oxide concentration rise information is not detected (NO in step S150), it is determined whether the supply of the ozone gas to the object is finished or not (step S160). If the supply of the ozone gas to the object is finished (YES in step S160), the operation of the ozone supply system 1 is stopped so that the supply of the ozone gas is finished. If the supply of the ozone gas to the object is not finished (NO in step S160), the ozone gas continues to be supplied to the object through the first channel. The ozone concentration detector 30 continues to detect the concentration of ozone generated in the ozone generating device 10.

On the other hand, at time $t_{13}$ at the same time as or after time $t_{12}$ and before time $t_{16}$, it is determined in the second removing cylinder 20B whether nitrogen oxide adsorbability of the second adsorbent (adsorbent 29) needs to be restored or not (step U20). If it is determined that sufficient adsorbability remains and restoration is unnecessary in consideration of an operation history of the second removing cylinder 20B, for example, (NO in step U20), the second removing cylinder 20B is in a standby state. On the other hand, if it is determined that the restoration is necessary in step U20, the step of restoring nitrogen oxide adsorbability of the adsorbent 29 (second adsorbent) is performed as step U30. In this step U30, while the adsorbent 29 (second adsorbent) in the second removing cylinder 20B is heated, a purge gas is introduced into the second removing cylinder 20B so that the nitrogen oxide adsorbed on the adsorbent 29 is separated and emitted out of the second removing cylinder 20B with the purge gas. In this manner, the nitrogen oxide adsorbability of the adsorbent 29 can be restored. The restoration of nitrogen oxide adsorbability of the adsorbent 29 (second adsorbent) of the second removing cylinder 20B can be performed in a procedure similar to that of the first adsorbent of the first embodiment.

Next, in the second removing cylinder 20B, the process of reducing ozone adsorbability of the adsorbent 29 (second adsorbent) is performed as step U40. In this step U40, part of the ozone gas from the ozone generating device 10 is introduced into the second removing cylinder 20B so that the ozone gas is adsorbed on the second adsorbent, and thereby, ozone adsorbability of the second adsorbent (adsorbent 29) is reduced. The reduction of ozone adsorbability of the second adsorbent can be performed in a procedure similar to that of the first adsorbent of the first embodiment.

With reference to FIG. 10, at time $t_{15}$ after time $t_{13}$ and time $t_{14}$ and at the same time as or before time $t_{16}$, step (U40) is completed. Specifically, with reference to FIG. 8, the valves 68, 69B, 71B, and 76 are closed. In time $t_{15}$ through $t_{16}$, the second removing cylinder 20B is in the standby state.

(3) Time $t_{16}$ Through $t_{20}$

With reference to FIG. 10, in time $t_{16}$ through to, steps S110 through S130 is are repeated in control of the supply path of the ozone gas. In the ozone generating device, after steps T20 through T30 are repeated in time $t_{16}$ through $t_{18}$, and step T10 is repeatedly performed in time Us through $t_{20}$. In the first removing cylinder, steps U20 through U40 are performed in time $t_{17}$ through $t_{19}$. In the second removing cylinder, in time $t_{16}$ through $t_{20}$, step U10 is performed.

With reference to FIGS. 8, 9, and 5, at time $t_{16}$, if the ozone concentration detector 30 detects that the ozone gas concentration becomes out of the predetermined concentration range, for example, if the ozone gas concentration decreases below the predetermined concentration range (YES in step T10), in a manner similar to the first embodiment, the ozone concentration detector 30 outputs nitrogen oxide concentration rise information, and the control section 40 detects the information (YES in step S150). Based on the nitrogen oxide concentration rise information, the control section 40 switches the ozone gas from the ozone generating device 10 to a state where the ozone gas is supplied to the object through the second channel (step S110). Specifically, with reference to FIG. 8, the valves 67, 69A, 71A, and 75 are closed and the valves 68, 69B, 71B, and 77 are opened. The other valves are kept in the same states as those in step S140. In this manner, with reference to FIG. 8, the ozone gas ejected from the ozone generating device 10 is supplied to the object through the pipes 85, 87, 91B, 92B, 98, and 102 constituting the second channel.

At the same time as or after start of the ozone gas through the second channel (step S110), electrodes in the ozone generating device 10 are heated so that dinitrogen pentoxide is removed (step T20). The removal of dinitrogen pentoxide by heating the electrodes (step T20) is performed in a manner similar to that of the first embodiment.

In the step of supplying the ozone gas through the second channel (S110), the ozone gas ejected from the ozone generating device 10 flows into the removing cylinder (second removing cylinder 20B) holding the adsorbent 29 of silica gel. The nitrogen oxide contained in the ozone gas is adsorbed on the adsorbent 29 (second adsorbent), and the ozone gas having a reduced concentration of the nitrogen oxide is ejected from the second removing cylinder 20B (step U10). The ozone gas ejected from the second removing cylinder 20B is then supplied to the object through the pipes 92B, 98, and 102. As described above, although the concentration of the nitrogen oxide contained in the ozone gas increases by performing the step of heating the electrodes (T20), the ozone gas is switched to the state where the ozone gas is supplied through the second channel (step S110), and the ozone gas ejected from the ozone generating device 10 flows into second removing cylinder 20B so that the nitrogen oxide is adsorbed (step U10). In this manner, the ozone gas having a reduced nitrogen oxide concentration is supplied to the object.

With reference to FIGS. 8 and 5, after start of heating of the electrodes of the ozone generating device 10, the ozone concentration detector 30 monitors whether the ozone gas concentration has restored to a range within the predetermined concentration range or not (step T30). If the ozone gas concentration is not within the predetermined concentration range (NO in step T30), the electrodes continue to be heated. At time Us, if the ozone concentration detector 30 detects that the ozone gas concentration comes to be within the predetermined concentration range (YES in step T30), heating of the electrodes is finished. Thereafter, the process returns to step T10 again, and the ozone concentration is monitored. Subsequently, similarly to time $t_{11}$ through $t_{12}$, step T10 is repeatedly performed until time $t_{20}$.

With reference to FIGS. 8 and 9, after start of supply of the ozone gas through the second channel, it is determined whether the supply of the ozone gas to the object is finished or not (step S120). If the supply of the ozone gas to the object is finished (YES in step S120), the operation of the ozone supply system 1 is stopped so that the supply of the ozone gas is finished. If the supply of the ozone gas to the object is not finished (NO in step S120), it is determined whether nitrogen oxide concentration rise information is detected or not (step S130). If the nitrogen oxide concentration rise information is not detected (NO in step S130), the ozone gas continues to be supplied to the object through the second channel. The ozone concentration detector 30 continues to detect the concentration of ozone generated in the ozone generating device 10.

On the other hand, at time $t_{17}$ at the same time as or after time $t_{16}$ and before time $t_{20}$, it is determined in the first removing cylinder 20A whether nitrogen oxide adsorbability of the first adsorbent (adsorbent 29) needs to be restored or not (step U20). If it is determined that sufficient adsorbability remains and restoration is unnecessary in consideration of an operation history of the first removing cylinder 20A, for example, (NO in step U20), the first removing cylinder 20A is in a standby state. On the other hand, if it is determined that the restoration is necessary (YES in step U20), the step of restoring nitrogen oxide adsorbability of the adsorbent 29 (first adsorbent) is performed as step U30. In this step U30, while the adsorbent 29 (first adsorbent) in the first removing cylinder 20A is heated, a purge gas is introduced into the first removing cylinder 20A so that the nitrogen oxide adsorbed on the adsorbent 29 is separated and emitted out of the first removing cylinder 20A with the purge gas. In this manner, the nitrogen oxide adsorbability of the adsorbent 29 can be restored. The restoration of nitrogen oxide adsorbability of the adsorbent 29 (first adsorbent) in the first removing cylinder 20A can be performed in a procedure similar to that in the first embodiment.

Next, in the first removing cylinder 20A, the process of reducing ozone adsorbability of the adsorbent 29 (first adsorbent) is performed as step U40. In this step U40, part of the ozone gas from the ozone generating device 10 is introduced into the first removing cylinder 20A so that the ozone gas is adsorbed on the first adsorbent 29, and thereby, ozone adsorbability of the first adsorbent (adsorbent 29) is reduced. The reduction of ozone adsorbability of the first adsorbent can be performed in a procedure similar to that in the first embodiment.

With reference to FIG. 10, at time $t_{19}$ after time $t_{17}$ and time Us and at the same time as or before time $t_{20}$, step U40 is completed. Specifically, with reference to FIG. 8, the valves 67, 69A, 71A, and 74 are closed. In time $t_{19}$ through to, the first removing cylinder 20A is in the standby state. That is, similarly to time $t_{11}$ through $t_{12}$ described above, in time $t_{19}$ through $t_{20}$, steps S110 through S130 are repeatedly performed in control of the supply path of the ozone gas, and step T10 is repeatedly performed in the ozone generating device. The first removing cylinder 20A disposed on the first channel is in a standby state. In the second removing cylinder 20B disposed on the second channel, step U10 is performed. The time when the ozone concentration detector 30 detects that the ozone gas concentration becomes out of the predetermined concentration range is assumed as time $t_{12}$, the control described above is repeated after time $t_{12}$.

In the method for supplying an ozone gas according to this embodiment, the step (S110 through S130; time $t_{16}$ through $t_{20}$) of supplying the ozone gas from the ozone generating device 10 through the second channel includes the step (U40; time $t_{17}$ through $t_{19}$) of reducing ozone adsorbability of the first adsorbent in the first removing cylinder 20A disposed on the first channel. In the step (S140 through S160; time $t_{12}$ through $t_{16}$) of supplying the ozone gas from the ozone generating device 10 through the first channel, the ozone gas passes through the first removing cylinder 20A that holds the first adsorbent whose ozone adsorbability has been reduced in the step (U40; time $t_{17}$ through $t_{19}$) of reducing ozone adsorbability of the first adsorbent. Accordingly, adsorption of the ozone gas on the first adsorbent is reduced so that the concentration of the ozone gas can be stabilized. In the method for supplying an ozone gas according to this embodiment, the step (S140 through S160; time $t_{12}$ through $t_{16}$) of supplying the ozone gas from the ozone generating device 10 through the first channel includes the step (U40; time $t_{13}$ through $t_{15}$) of reducing ozone adsorbability of the second adsorbent in the second removing cylinder 20B disposed on the second channel. In the step (S110 through S130; time $t_{16}$ through $t_{20}$) of supplying the ozone gas from the ozone generating device 10 through the second channel, the ozone gas passes through the second removing cylinder 20B that holds the second adsorbent whose ozone adsorbability has been reduced in the step (U40; time $t_{13}$ through $t_{15}$) of reducing ozone adsorbability of the second adsorbent. Accordingly, adsorption of the ozone gas on the second adsorbent is reduced so that the concentration of the ozone gas can be stabilized. In the manner described above, with the method for supplying an ozone gas according to this embodiment, an ozone gas from which nitrogen oxide is removed can be supplied to the object at a stable concentration.

In the second embodiment, switching from one of the first channel and the second channel to the other channel is preferably performed after it is determined that the removing cylinder disposed on the other (latter) channel is in the standby state.

Third Embodiment

Next, a system for supplying an ozone gas according to a third embodiment as another embodiment will be described. The system for supplying an ozone gas according to the third embodiment basically has a configuration and advantages similar to those of the second embodiment. The system for supplying an ozone gas according to the third embodiment is different from that of the second embodiment in including a buffer vessel.

Figure 11:
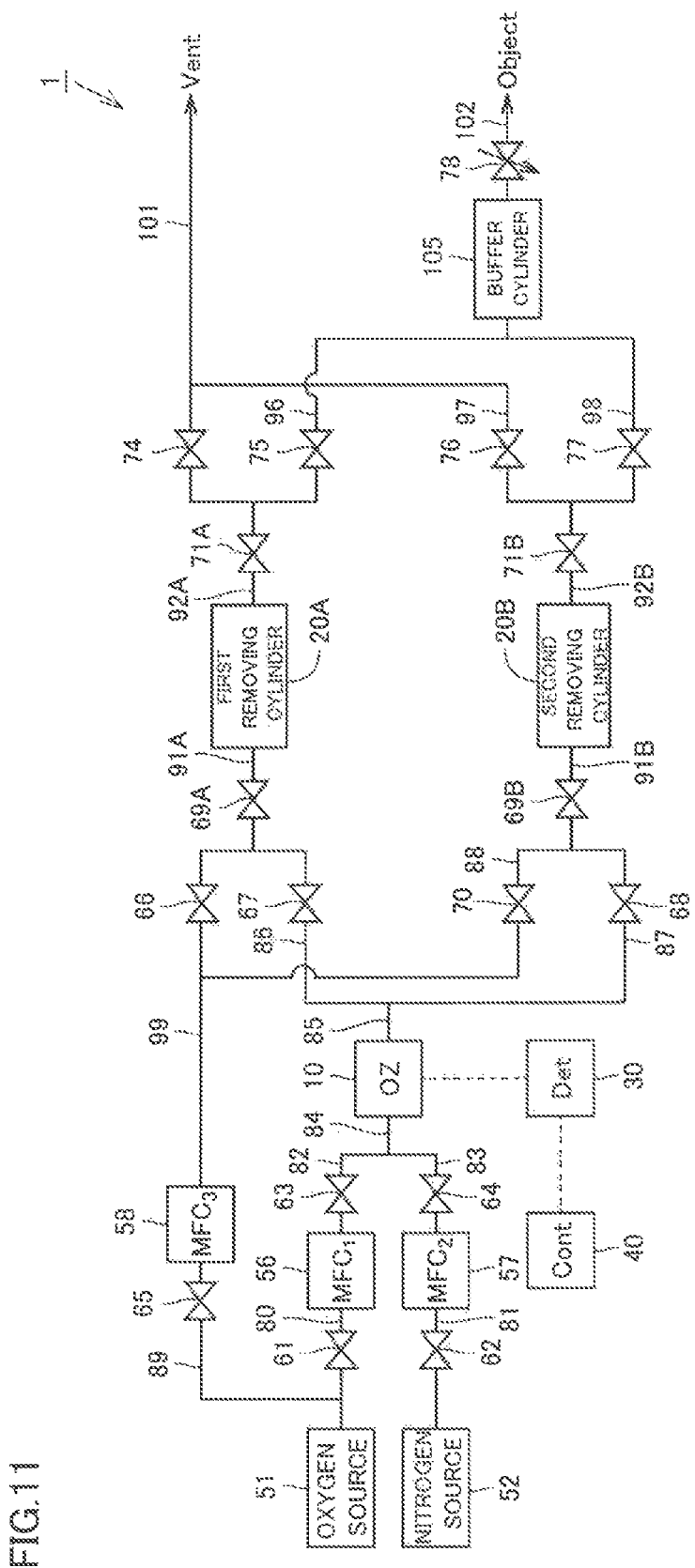
FIG. 11 is a schematic drawing illustrating an example configuration of an ozone gas supply system according to a third embodiment.

With reference to FIG. 11, a buffer cylinder 105 as a buffer vessel for leveling an ozone gas concentration is disposed on a pipe 102 of an ozone supply system 1 according to the third embodiment. The buffer cylinder 105 may be filled with silica gel, which is a material for adsorbing and desorbing an ozone gas, or may not be filled with silica gel. The presence of the buffer cylinder 105 can be supplied to the ozone gas of a stable concentration to an object.

In the embodiments described above, the standby state refers to a state where the process of reducing ozone adsorbability (U40) is performed and sufficient removability of nitrogen oxide can be obtained. More specifically, in this state, the process of restoring adsorbability of a nitrogen oxide (U30) and the process of reducing ozone adsorbability (U40) are performed, sufficient nitrogen oxide adsorbability remains, and ozone adsorbability is reduced.

Although the embodiments described above are directed to the case where control is performed with switching between the first channel and the second channel, the method for supplying an ozone gas and a system for supplying an ozone gas according to the present invention are not limited to these embodiments. For example, switching may be performed for three or more channels including a third channel Specifically, there may be a third channel on which a third removing cylinder (third vessel) holding a third adsorbent is disposed. In such a case, the time for restoring nitrogen oxide adsorbability of the adsorbent and the time for reducing ozone adsorbability can be easily obtained. Accordingly, a stable operation can be performed as compared to the case where the first channel and the second channel alternately operate. The embodiments described above are directed to an example in which the concentration of the nitrogen oxide contained in an ozone gas increases when the nitrogen oxide attached to the electrodes of the ozone gas source (ozone generating device 10) is removed. Applications of the method for supplying an ozone gas and the system for supplying an ozone gas according to the present invention, however, are not limited to this example. For example, the method for supplying an ozone gas and the system for supplying an ozone gas according to the present invention are applicable in a case where the concentration of a nitrogen oxide contained in an ozone gas increases for some reasons, for example, a case where the concentration of the nitrogen oxide contained in the ozone gas increases in removing the nitrogen oxide attached to a pipe (peripheral pipe) downstream of the ozone gas source.

Fourth Embodiment

Figure 12:
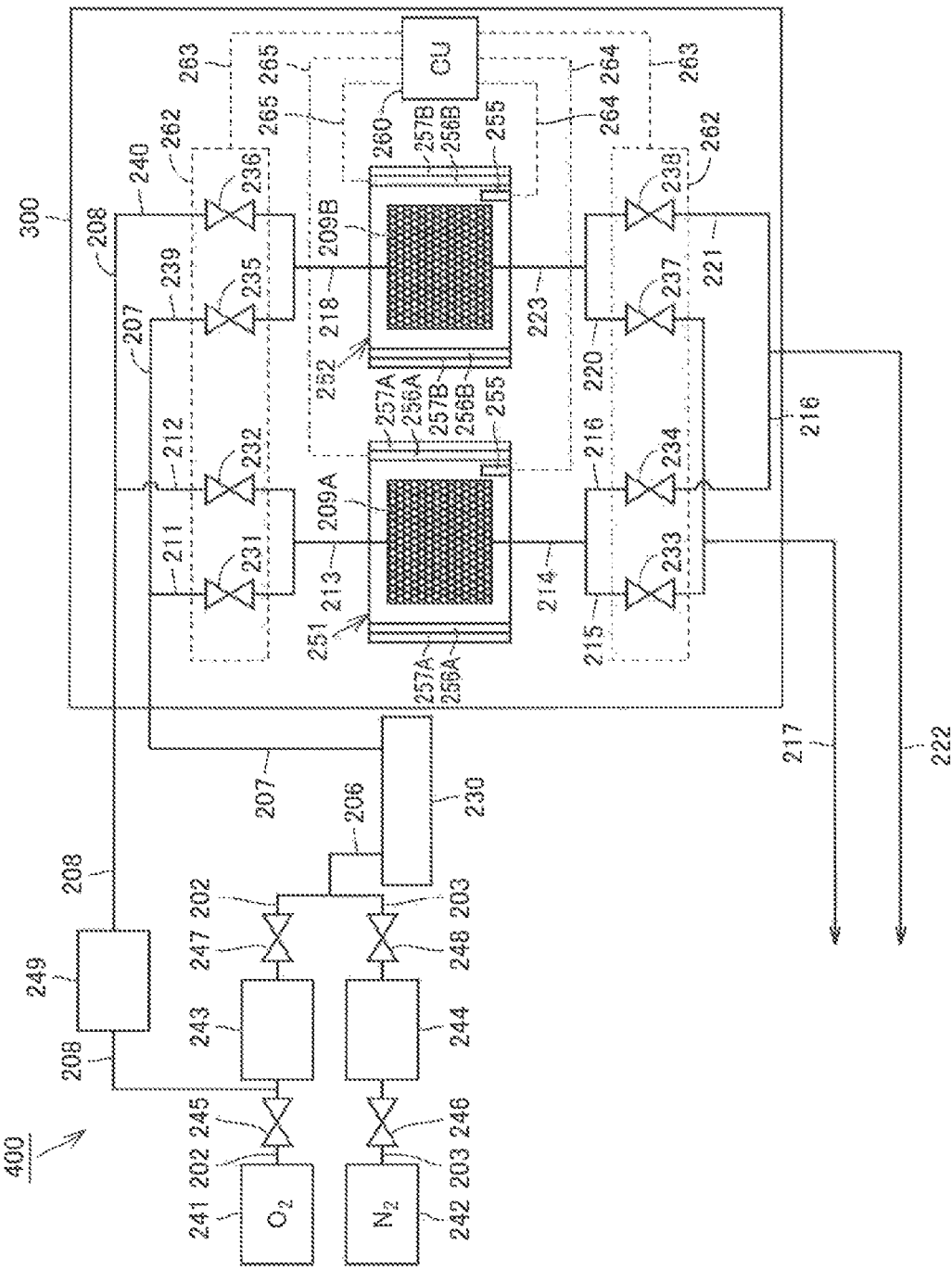
FIG. 12 is a schematic drawing illustrating example configurations of an ozone gas supply apparatus and an ozone gas removing apparatus according to a fourth embodiment.

1. Configurations of Ozone Gas Supply Apparatus and Nitrogen Oxide Removing Device According to Embodiment FIG. 12 is a schematic drawing illustrating example configurations of an ozone gas supply apparatus and a nitrogen oxide removing device according to a fourth embodiment. In FIG. 12, connection by pipes is indicated by solid lines, and electrical connection is indicated by broken lines. With reference to FIG. 12, an ozone gas supply apparatus 400 is an apparatus that generates an ozone gas using an oxygen gas supplemented with a trace amount of a nitrogen gas as a raw material and supplies the ozone gas. The ozone gas supply apparatus 400 includes an ozone generating device 230 as an ozone generator, and a nitrogen oxide removing device 300 that is connected to the ozone generating device 230 and removes a nitrogen oxide from an ozone gas generated by the ozone generating device 230 and containing the nitrogen oxide. The ozone gas supply apparatus 400 also includes an oxygen flow rate adjuster 243, a nitrogen flow rate adjuster 244, a purge gas flow rate adjuster 249, a pipe 217 connected to a process line (not shown), and a pipe 222 connected to a vent (not shown).

The ozone generating device 230 is connected to an oxygen gas storing section 241 as an oxygen source for holding oxygen, through a junction pipe 206 and an oxygen gas pipe 202. The ozone generating device 230 is connected to a nitrogen gas storing section 242 as a nitrogen source for holding nitrogen, through the junction pipe 206 and a nitrogen gas pipe 203. The oxygen gas pipe 202 and the nitrogen gas pipe 203 are connected to the junction pipe 206. The oxygen gas pipe 202 is provided with an oxygen flow rate adjuster 243. The oxygen flow rate adjuster 243 is, for example, a mass flow controller. The oxygen flow rate adjuster 243 adjusts the flow rate of an oxygen gas flowing from the oxygen gas pipe 202 to the junction pipe 206. A valve 245 is disposed in a region of the oxygen gas pipe 202 connecting the oxygen gas storing section 241 and the oxygen flow rate adjuster 243 to each other. A valve 247 is disposed in a region of the oxygen gas pipe 202 connecting the oxygen flow rate adjuster 243 and the junction pipe 206 to each other. A purging oxygen gas pipe 208 is connected to a point of the oxygen gas pipe 202 between the valve 245 and the oxygen flow rate adjuster 243. The purging oxygen gas pipe 208 is provided with the purge gas flow rate adjuster 249. The purge gas flow rate adjuster 249 is, for example, a mass flow controller.

The nitrogen gas pipe 203 is provided with the nitrogen flow rate adjuster 244. The nitrogen flow rate adjuster 244 is, for example, a mass flow controller. The nitrogen flow rate adjuster 244 adjusts a flow rate of a nitrogen gas flowing from the nitrogen gas pipe 203 to the junction pipe 206. A valve 246 is disposed in a region of the nitrogen gas pipe 203 connecting the nitrogen gas storing section 242 and the nitrogen flow rate adjuster 244 to each other. A valve 248 is disposed in a region of the nitrogen gas pipe 203 connecting the nitrogen flow rate adjuster 244 and the junction pipe 206 to each other. A mixture gas obtained by adding a nitrogen gas of less than several volume percentages to an oxygen gas, for example, flows into the ozone generating device 230. A mixing ratio between the oxygen gas and the nitrogen gas is adjusted in the oxygen flow rate adjuster 243 and the nitrogen flow rate adjuster 244. Although this embodiment employs the configuration in which the junction pipe 206 is connected to the ozone generating device 230 so that a mixture gas of the oxygen gas and the nitrogen gas flows into the ozone generating device 230 through the junction pipe 206, the oxygen gas pipe 202 and the nitrogen gas pipe 203 may be directly connected to the ozone generating device 230.

The ozone generating device 230 generates an ozone gas containing a nitrogen oxide by electric discharge in a mixture gas of an oxygen gas and a nitrogen gas supplied from the oxygen gas storing section 241 as an oxide source holding oxygen and the nitrogen gas storing section 242 as a nitrogen source holding nitrogen, respectively. The ozone generating device 230 is connected to an ozone gas transfer pipe 207. The ozone generating device 230 is connected to the nitrogen oxide removing device 300 through the ozone gas transfer pipe 207. The ozone gas generated by the ozone generating device 230 is supplied to the nitrogen oxide removing device 300 through the ozone gas transfer pipe 207.

Next, the nitrogen oxide removing device 300 will be described. The nitrogen oxide removing device 300 removes a nitrogen oxide contained in an ozone gas. The nitrogen oxide removing device 300 includes: a removing cylinder 251 as a first vessel for holding a first adsorbent 209A of silica gel; a removing cylinder 252 as a second vessel for holding a second adsorbent 209B of silica gel; a first ozone gas pipe 211 connected to the removing cylinder 251 and defining a channel of an ozone gas flowing from the ozone generating device 230 into the removing cylinder 251; a second ozone gas pipe 239 connected to the removing cylinder 252 and defining a channel of an ozone gas flowing from the ozone generating device 230 into the removing cylinder 252; a first ozone gas valve 231 disposed on a first ozone gas pipe 211; and a second ozone gas valve 235 disposed on a second ozone gas pipe 239. The nitrogen oxide removing device 300 further includes: a first purge gas pipe 212 connected to the removing cylinder 251 and defining a channel of a purge gas flowing into the removing cylinder 251; a second purge gas pipe 240 connected to the removing cylinder 252 and defining a channel of a purge gas flowing into the removing cylinder 252; a first purge gas valve 232 disposed on the first purge gas pipe 212; a second purge gas valve 236 disposed on a second purge gas pipe 240; a first outflow pipe 214 connected to the removing cylinder 251 and defining a channel of a gas flowing out of the removing cylinder 251; a second outflow pipe 223 connected to the removing cylinder 252 and defining a channel of a gas flowing out of the removing cylinder 252; a temperature adjuster 256A as a first heating unit for heating the inside of the removing cylinder 251; a temperature adjuster 256B as a second heating unit for heating the inside of the removing cylinder 252; and a control section 260. In this embodiment, the temperature adjusters 256A and 256B are ribbon heaters. The nitrogen oxide removing device 300 is connected to the oxygen gas pipe 202 through the purging oxygen gas pipe 208. The purging oxygen gas pipe 208 is connected to the first purge gas pipe 212 and the second purge gas pipe 240. The purging oxygen gas pipe 208 defines a channel of an oxygen gas flowing as a purge gas from the oxygen gas storing section 241 into the first purge gas pipe 212 and the second purge gas pipe 240. The configuration in which the oxygen gas storing section 241 holding an oxygen gas as a raw material of an ozone gas can also be used as a source of a purge gas is employed so that facilities can be simplified.

Thereafter, the removing cylinders 251 and 252 will be described. The removing cylinders 251 and 252 respectively include adsorbents 209A and 209B therein. Silica gel constituting each of the adsorbents 209A and 209B is adjusted to have a purity of 99.99% by mass or more. Each of the removing cylinders 251 and 252 is provided with a temperature detection sensor 255 for measuring a temperature. As the temperature detection sensor 255, a thermocouple or a thermistor, for example, may be employed. The temperature detection sensor 255 is connected to the control section 260, and detects a temperature inside a corresponding one of the removing cylinders 251 and 252.

Figure 13:
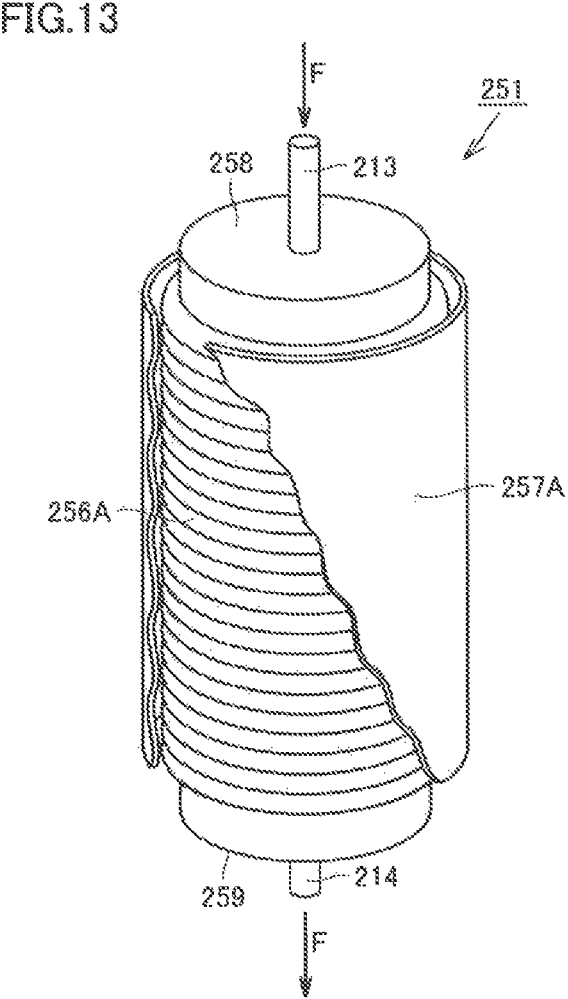
FIG. 13 is a view illustrating a schematic configuration of a removing cylinder.

The removing cylinder 251 and the removing cylinder 252 have similar configurations. These configurations will now be described using the removing cylinder 251 as an example. FIG. 13 is a view illustrating a schematic configuration of the removing cylinder. With reference to FIG. 13, the removing cylinder 251 has a hollow cylindrical shape whose both ends are closed with disc-shaped bottom walls 258 and 259. A junction pipe 213 is connected to and penetrates the bottom wall 258 at one end of the removing cylinder 251 so that the junction pipe 213 serves as a channel of a gas flowing into the removing cylinder 251 along a gas flow direction F. A first outflow pipe 214 is connected to the bottom wall 259 at the other end of the removing cylinder 251 so that the first outflow pipe 214 serves as a channel of a gas flowing out of the removing cylinder 251 along the gas flow direction F. The removing cylinder 251 includes the temperature adjuster 256A for heating the inside of the removing cylinder 251. A ribbon heater that is the temperature adjuster 256A is disposed to wound around the outer peripheral surface of the removing cylinder 251. The temperature adjuster 256A is connected to the control section 260 to adjust the temperature inside the removing cylinder 251 based on an instruction from the control section 260. A jacket 257A including a heat insulator is attached to surround the outer periphery of the temperature adjuster 256A. The attachment of the jacket 257A can keep the temperature of the removing cylinder 251 and also can reduce the influence of the temperature of one of the removing cylinders 251 and 252 on the temperature of the other removing cylinder.

With reference to FIG. 12, the removing cylinder 251 is connected to the first ozone gas pipe 211 and the first purge gas pipe 212 through the junction pipe 213. The first ozone gas pipe 211 is connected to the ozone gas transfer pipe 207 and defines a channel of an ozone gas flowing from the ozone generating device 230 into the removing cylinder 251. The first ozone gas pipe 211 is provided with the first ozone gas valve 231. The first purge gas pipe 212 is connected to the purging oxygen gas pipe 208 and defines a channel of a purge gas flowing into the removing cylinder 251. The first purge gas pipe 212 is provided with the first purge gas valve 232. The first ozone gas pipe 211 and the first purge gas pipe 212 may be directly connected to the removing cylinder 251.

The first outflow pipe 214 is connected to the removing cylinder 251. The first outflow pipe 214 defines a channel of a gas flowing out of the removing cylinder 251. The first outflow pipe 214 is connected to a pipe 215 and a pipe 216. The pipe 215 is connected to the pipe 217 connected to the unillustrated process line. The pipe 216 is connected to the pipe 222 connected to the unillustrated vent. The pipe 215 is provided with a valve 233. The pipe 216 is provided with a valve 234.

The removing cylinder 252 has a configuration similar to the configuration of the removing cylinder 251. The removing cylinder 252 holds the second adsorbent 209B of silica gel corresponding to the first adsorbent 209A of the removing cylinder 251, and is connected to or provided with a junction pipe 218 connected to the second ozone gas pipe 239 and the second purge gas pipe 240, the second outflow pipe 223, the temperature adjuster 256B, and the jacket 257B respectively corresponding to the junction pipe 213 connected to the first ozone gas pipe 211 and the first purge gas pipe 212, the first outflow pipe 214, the temperature adjuster 256A, and the jacket 257A. The second outflow pipe 223 is connected to a pipe 220 and a pipe 221. The pipe 220 is connected to the pipe 217 connected to the unillustrated process line. The pipe 221 is connected to the pipe 222 connected to the unillustrated vent. The pipe 220 is provided with a valve 237. The pipe 221 is provided with a valve 238.

This embodiment is directed to the case where the temperature adjusters 256A and 256B are ribbon heaters, but each of the temperature adjusters 256A and 256B may include the ribbon heater and a cooling section. Specifically, the nitrogen oxide removing device 300 included in the ozone gas supply apparatus 400 may further include the temperature adjuster 256A serving as a first cooling section for cooling the inside of the removing cylinder 251, and the temperature adjuster 256B serving as a second cooling section for cooling the inside of the removing cylinder 252. In this manner, the inside of the removing cylinders 251 and 252 heated for separating the nitrogen oxide from the adsorbents 209A and 209B can be efficiently cooled, and the step of causing the nitrogen oxide in the introduced ozone gas to be adsorbed on the adsorbents 209A and 209B can be performed at low temperatures.

Figure 14:
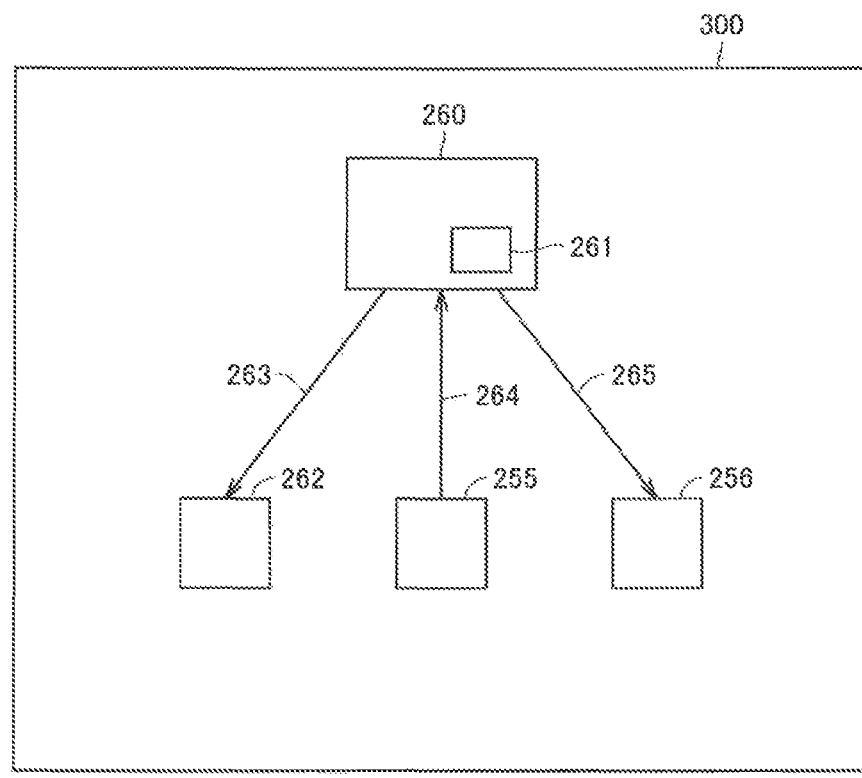
FIG. 14 is a block diagram illustrating a schematic electrical configuration of the ozone gas removing apparatus.

Then, the control section 260 will be described. FIG. 14 is a block diagram illustrating a schematic electrical configuration of the nitrogen oxide removing device. The control section 260 are connected to the temperature detection sensors 255 and 255, and the temperature adjuster 56 (temperature adjusters 256A and 256B) disposed in the removing cylinders 251 and 252, and a valve group 262 (valves 231, 232, 233, 234, 235, 236, 237, and 238; see FIG. 12). The control section 260 performs open/close control of the valve group 262 and temperature control of the removing cylinders 251 and 252. Specifically, with reference to FIG. 14, the temperature detection sensor 255 is connected to the control section 260, measures temperatures inside the removing cylinders 251 and 252, and outputs a temperature information signal 264 including temperature information to the control section 260. Based on the temperature information signal 264, the control section 260 outputs a temperature control information signal 265. Based on the temperature control information signal 265, the temperature adjuster 56 adjusts the temperatures inside the removing cylinders 251 and 252.

The control section 260 includes an adsorption state determining section 261 for determining the adsorption state of the nitrogen oxide on each of the adsorbents 209A and 209B. In this embodiment, the adsorption state determining section 261 includes a timer for counting a time in which an ozone gas flows into each of the removing cylinders 251 and 252 and a heating time by each of the temperature adjusters 256A and 256B. Based on the ozone gas inflow times and the heating times by the temperature adjusters 256A and 256B, the adsorption state determining section 261 determines the adsorption state of the nitrogen oxide on each of the adsorbents 209A and 209B. Based on a determination result of the adsorption state determining section 261, the control section 260 outputs a valve open/close signal 263 to the valve group 262 to control opening and closing of the valve group 262.

Figure 15:
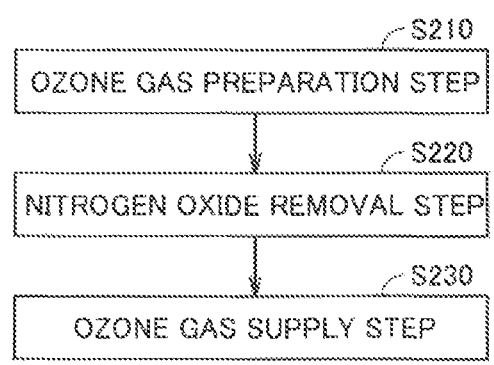
FIG. 15 is a flowchart depicting an example procedure of a method for supplying an ozone gas.
Figure 16:
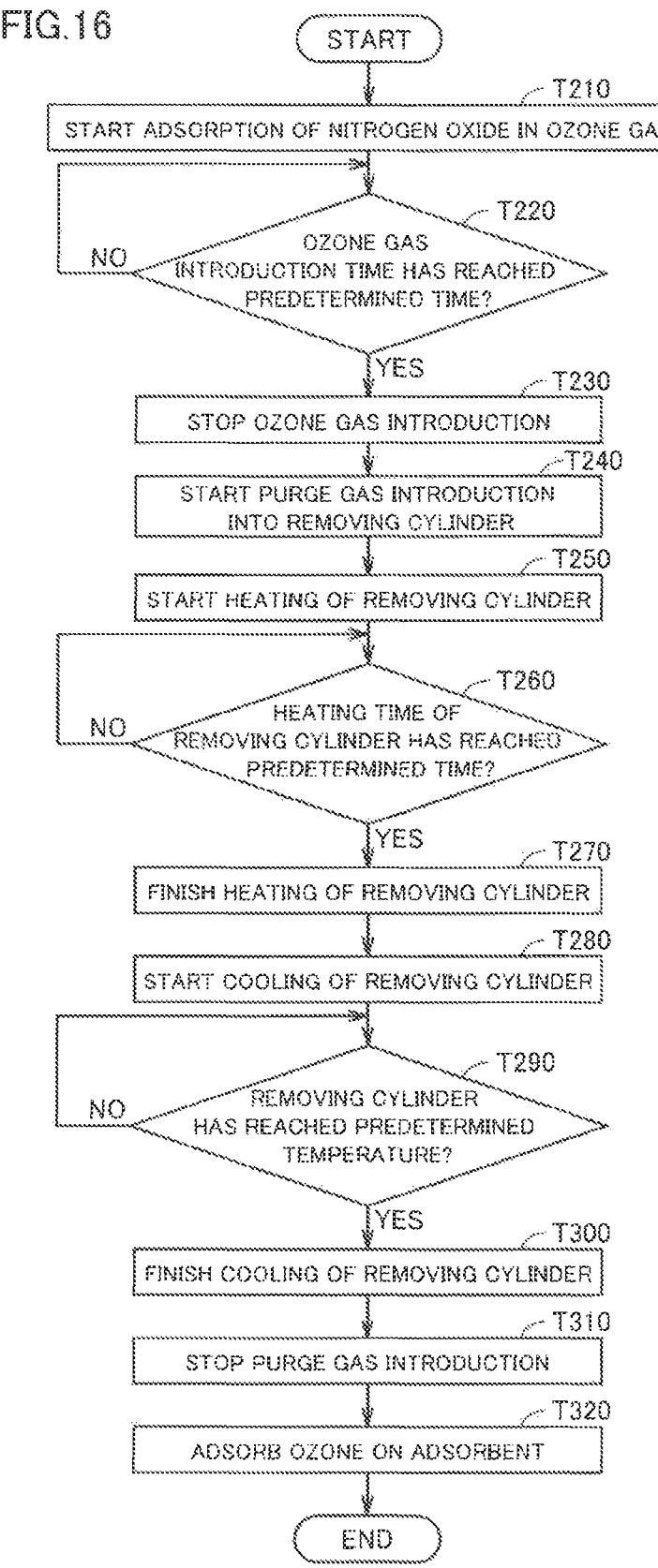
FIG. 16 is a flowchart depicting an example procedure of a method for removing a nitrogen oxide using a removing cylinder.
Figure 17:
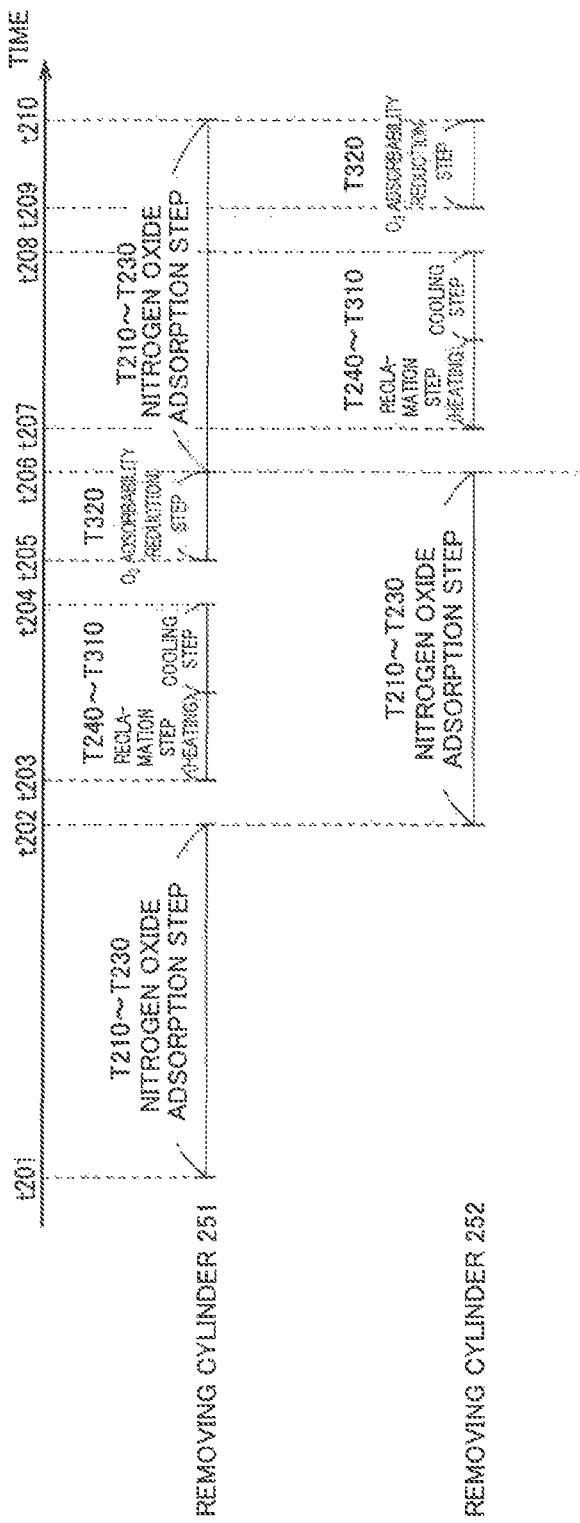
FIG. 17 is a timing chart depicting an example procedure of a nitrogen oxide removing step in the fourth embodiment.

2. Method for Supplying Ozone Gas and Method for Removing Nitrogen Oxide According to Embodiment With reference now to FIGS. 12, 15, 16, and 17, a method for supplying an ozone gas and a method for removing a nitrogen oxide according to the fourth embodiment of the present invention will be described. FIG. 15 is a flowchart depicting an example procedure of the method for supplying an ozone gas using the ozone gas supply apparatus. FIG. 16 is a flowchart depicting an example procedure of the method for removing a nitrogen oxide using the removing cylinder of the nitrogen oxide removing device. FIG. 17 is a timing chart depicting an example procedure of a nitrogen oxide removal step in the fourth embodiment. With reference to FIG. 15, the method for supplying an ozone gas according to the fourth embodiment includes an ozone gas preparation step (S210), a nitrogen oxide removal step (S220), and an ozone gas supply step (S230).

(1) Ozone Gas Preparation Step (S210)

With reference to FIG. 15, in the method for supplying an ozone gas according to the fourth embodiment, the ozone gas preparation step (S210) is first performed. In step S210, an ozone gas including a nitrogen oxide is prepared.

With reference to FIG. 12, in step S210, the valve 245 is opened so that an oxygen gas is caused to flow from the oxygen gas storing section 241, and the valve 246 is opened so that a nitrogen gas is caused to flow from the nitrogen gas storing section 242. The valves 247 and 248 are opened so that the oxygen gas whose flow rate has been adjusted in the oxygen flow rate adjuster 243 and the nitrogen gas whose flow rate has been adjusted in the nitrogen flow rate adjuster 244 are merged together in the junction pipe 206 to be a mixture gas, and the mixture gas is introduced into the ozone generating device 230. Specifically, a mixture gas in which the nitrogen gas of less than several percentages by volume, for example, is added to the oxygen gas is introduced as a source gas from the junction pipe 206 into ozone generating device 230. Then, through electric discharge in the mixture gas, an ozone gas containing a nitrogen oxide is generated by the ozone generating device 230 (S210).

More specifically, in the ozone generating device 230, an ozone gas is generated by electric discharge from the oxygen gas as a raw material, and at the same time, as represented by Expression (1), a part of the nitrogen gas added to the oxygen gas (several percentages of the added nitrogen gas) becomes nitrogen dioxide ($NO_2$). Next, as represented by Equation (2), dinitrogen pentoxide ($N_2O_5$) is generated by reaction between nitrogen dioxide and the ozone gas. As represented by Equation (3), nitric acid ($HNO_3$) is generated by reaction between moisture and dinitrogen pentoxide. The removal of the generated dinitrogen pentoxide and nitric acid as described above can suppress corrosion of pipes. In this embodiment, dinitrogen pentoxide and nitric acid can be removed by using the adsorbents 209A and 209B of silica gel.

$$NO+O_3 \rightarrow NO_2+O_2 \tag{1}$$

$$2NO_2+O_3 \rightarrow N_2O_5+O_2 \tag{2}$$

$$N_2O_5+H_2O \rightarrow 2HNO_3 \tag{3}$$

(2) Nitrogen Oxide Removal Step (S220)

Next, the nitrogen oxide removal step (S220) is performed. In step S220, the timings are shifted from each other between the removing cylinder 251 and the removing cylinder 252 so that removal of nitrogen oxide and reclamation of the adsorbent are alternately performed. FIG. 16 depicts a procedure of removal of nitrogen oxide and reclamation of the adsorbent in each of the removing cylinders 251 and 252. With reference to FIG. 16, the process of removal of the nitrogen oxide and reclamation of the adsorbent in the removing cylinders 251 and 252 includes: a nitrogen oxide adsorption step of causing a nitrogen oxide in the ozone gas introduced into the removing cylinders 251 and 252 to be adsorbed on the adsorbents 209A and 209B (T210 through T230); a reclamation step of performing a reclamation process of the adsorbents 209A and 209B and a cooling step (T240 through T310); and an ozone adsorbability reduction step of causing ozone to be adsorbed on the adsorbents 209A and 209B having restored nitrogen oxide adsorbability to reduce ozone adsorbability (T320).

With reference to FIG. 16, a procedure of removal of nitrogen oxide and reclamation of the adsorbents in the removing cylinders 251 and 252 will be described for the case of the removing cylinder 251, for example. First, the nitrogen oxide adsorption step (T210 through T230) is performed. In steps T210 through T230, first, an ozone gas is introduced into the removing cylinder 251 so that adsorption of a nitrogen oxide in ozone is started (in FIG. 16, step T210; hereinafter "step" will be omitted). Specifically, with reference to FIG. 12, the valves 231 and 233 are opened with the valves 232 and 234 closed. In this manner, the ozone gas containing the nitrogen oxide generated in the ozone generating device 230 is introduced into the recovering cylinder 251 through the first ozone gas pipe 211 and the junction pipe 213. In the removing cylinder 251, the nitrogen oxide in the ozone gas is adsorbed on the first adsorbent 209A of silica gel, and the ozone gas having a reduced concentration of the nitrogen oxide is ejected from the first outflow pipe 214.

Then, the adsorption state determining section 261 determines whether an ozone gas introduction time has reached a predetermined time or not (T220). If the ozone gas introduction time reaches a predetermined time (YES in T220), the first ozone gas valve 231 is closed so that the introduction of the ozone gas is stopped (T230). Here, the "predetermined time" is determined in consideration of a time until nitrogen oxide adsorbability of the first adsorbent 209A held in the removing cylinder 251 decreases across a tolerance. More specifically, the "predetermined time" can be determined based on nitrogen oxide adsorbability of the first adsorbent 209A, the flow rate of a gas per a unit time, and the concentration of the nitrogen oxide in the gas.

Subsequently, the reclamation step of performing reclamation of the first adsorbent 209A and the cooling step (T240 through T310) are performed. First, introduction of a purge gas to the removing cylinder 251 is started (T240). Specifically, with reference to the FIG. 12, the valves 232 and 234 are opened with the valves 231 and 233 closed. In this manner, the oxygen gas as a purge gas flows from the oxygen gas storing section 241 into the removing cylinder 251 through the oxygen gas pipe 202, the purging oxygen gas pipe 208, the first purge gas pipe 212, and the junction pipe 213.

Thereafter, heating of the removing cylinder 251 by the temperature adjuster 256A disposed in the removing cylinder 251 is started (T250). At this time, the temperature detection sensor 255 measures a temperature inside the removing cylinder 251, and outputs the temperature information signal 264 including temperature information to the control section 260. Based on the temperature control information signal 265 output from the control section 260, the temperature adjuster 256A adjusts the temperature inside the removing cylinder 251. In this manner, the nitrogen oxide adsorbed on the first adsorbent 209A is separated and emitted to the outside with the oxygen gas serving as a purge gas. In this manner, nitrogen oxide adsorbability of the first adsorbent 209A is restored. The emission of the purge gas is performed by causing the oxygen gas containing the nitrogen oxide to flow out of the removing cylinder 251 to the vent through the first outflow pipe 214 and the pipes 216 and 222.

Then, the adsorption state determining section 261 determines whether the heating time of the removing cylinder 251 reaches the predetermined time or not (T260).

If the heating time reaches the predetermined time (YES in T260), heating of the removing cylinder 251 is finished (T270). Here, the predetermined time is a time necessary for reclamation of the first adsorbent 209A enough to be reusable for adsorption of the nitrogen oxide after sufficient separation of the nitrogen oxide adsorbed on the first adsorbent 209A.

Then, cooling of the removing cylinder 251 is started (T280). In this embodiment, cooling of the removing cylinder 251 is performed by air cooling. Thereafter, it is determined whether the temperature of the removing cylinder 251 has reached a predetermined temperature or not (T290). If the temperature of the removing cylinder 251 has reached the predetermined time (YES in T290), cooling of the removing cylinder 251 is finished (T300). Thereafter, the valves 232 and 234 are closed so that introduction of the purge gas is stopped (T310). The reclamation process of the first adsorbent 209A by the reclamation step and the cooling step in T240 through T310 may be performed continuously after the process of removing the nitrogen oxide in the ozone gas in T210 through T230 are finished or after a lapse of a predetermined time from the end of T210 through T230.

Thereafter, the step of reducing ozone adsorbability of the first adsorbent 209A subjected to the reclamation step and the cooling step (T320) is performed. In step T320, the ozone gas is introduced into the removing cylinder 251 so that ozone is adsorbed on the first adsorbent 209A to thereby reduce ozone adsorbability of the first adsorbent 209A. Specifically, with reference to FIG. 12, the first ozone gas valve 231 is opened with the first purge gas valve 232 closed. In this manner, the ozone gas generated by the ozone generating device 230 is introduced into the removing cylinder 251 through the first ozone gas pipe 211 and the junction pipe 213. In the removing cylinder 251, the ozone gas is adsorbed on the first adsorbent 209A, and ozone adsorbability of the first adsorbent 209A is reduced. As will be described later, this step T320 is performed at the same time as steps T210 through T230 for another removing cylinder (e.g., the removing cylinder 252). The flow rate of the ozone gas introduced into the removing cylinder 251 is preferably 10% or less, and more preferably 5% or less, of the flow rate of the ozone gas introduced into the other removing cylinder (e.g., the removing cylinder 252). In this manner, variations of the flow rate of ozone from which the nitrogen oxide is removed can be easily reduced. The ozone gas introduced into the removing cylinder 251 in step T320 may be caused to flow in the process line through the pipe 217 or flow to the vent through the pipe 222. From the viewpoint of further stabilizing the concentration of the ozone gas supplied to the process line, the ozone gas introduced into the removing cylinder 251 in step T320 is preferably caused to flow to the vent through the pipe 222 and not supplied to the process line.

In the removing cylinder 252, instead of the pipes 211, 212, 213, 214, 215, and 216 connected to the removing cylinder 251, the valves 231, 232, 233, and 234 provided on these pipes, and the temperature adjuster 256A disposed in the removing cylinder 251, the corresponding pipes 239, 240, 218, 223, 220, and 221, the valves 235, 236, 237, and 238 provided on these pipes, and the temperature adjuster 256B disposed in the removing cylinder 252 operate similarly. In this manner, removal of the nitrogen oxide and reclamation of the adsorbent are performed.

In this embodiment, steps T210 through T320 in the nitrogen oxide removal step (S220) are performed at different timings in the two removing cylinders 251 and 252. A procedure of performing the nitrogen oxide removal step (S220) using the two removing cylinders 251 and 252 will be described below. FIG. 17 is a timing chart depicting an example procedure of the nitrogen oxide removing step performed in the removing cylinders in the fourth embodiment.

In FIG. 17, the abscissa represents an elapsed time in the nitrogen oxide removal step. First, in time $t_{201}$ through $t_{202}$, the nitrogen oxide adsorption step (T210 through T230) is performed in the removing cylinder 251 for the ozone gas. Then, at time $t_{202}$, before adsorbability of the nitrogen oxide in the first adsorbent 209A of the removing cylinder 251 decreases across a tolerance, the inflow of the ozone gas is switched from the removing cylinder 251 to the removing cylinder 252. Thereafter, in time $t_{202}$ through $t_{206}$, the nitrogen oxide adsorption step of the ozone gas is performed in the removing cylinder 252. On the other hand, in the removing cylinder 251, in time $t_{203}$ through $t_{204}$ included in time $t_{202}$ through $t_{206}$, the reclamation step and cooling step (T240 through T310) are performed.

In time $t_{205}$ through $t_{206}$ included in time $t_{202}$ through $t_{206}$, an ozone adsorbability reduction step T320 is performed in the removing cylinder 251. Specifically, in time $t_{205}$ through $t_{206}$, the following step is performed. The ozone gas is introduced into the removing cylinder 252, and the nitrogen oxide is adsorbed on the second adsorbent 209B. While the ozone gas having a reduced nitrogen oxide concentration is ejected from the removing cylinder 252, the ozone gas is introduced into the removing cylinder 251 so that ozone is adsorbed on the first adsorbent 209A having restored nitrogen oxide adsorbability, and thereby, ozone adsorbability of the first adsorbent 209A is reduced. Then, at time $t_{206}$, after the step of reducing ozone adsorbability and before adsorbability of the second adsorbent 209B in the removing cylinder 252 decreases across the tolerance, the inflow of the ozone gas is switched from the removing cylinder 252 to the removing cylinder 251. Thereafter, in time $t_{206}$ through $t_{210}$, the nitrogen oxide adsorption step is continuously performed in the removing cylinder 251.

On the other hand, in the removing cylinder 252, in time $t_{207}$ through $t_{208}$ included in time $t_{206}$ through $t_{210}$, the reclamation step and the cooling step are performed. In addition, in time $t_{209}$ through $t_{210}$ included in time $t_{206}$ through $t_{210}$, the ozone adsorbability reducing step is performed in the removing cylinder 252.

As described above, in the nitrogen oxide removal step (S220) according to this embodiment, the ozone gas is introduced into the removing cylinder 251 before introduction of the ozone gas is switched from the removing cylinder 252 to the removing cylinder 251. In this manner, ozone is adsorbed on the first adsorbent 209A having restored nitrogen oxide adsorbability so that ozone adsorbability of the first adsorbent 209A in the removing cylinder 251 can be reduced. Accordingly, in reducing the nitrogen oxide in the ozone gas by introducing the ozone gas again to the removing cylinder 251 holding the first adsorbent 209A having restored nitrogen oxide adsorbability, ozone adsorbability of the first adsorbent 209A in the removing cylinder 251 is reduced. Thus, reduction of the concentration of the ozone gas ejected from the removing cylinder 251 is reduced. In this embodiment, the removal of the nitrogen oxide and reclamation of the adsorbent (including reduction of ozone adsorbability of the adsorbent) are alternately performed in the removing cylinder 251 and the removing cylinder 252. In this manner, according to this embodiment, the ozone gas from which the nitrogen oxide is removed can be continuously supplied at a stable concentration. In this embodiment, as the third vessel holding the third adsorbent according to the present invention, the removing cylinder 252 is used for removal of the nitrogen oxide.

(3) Ozone Gas Supply Step (S230)

Next, the ozone gas supply step (S230) is performed. In step S230, the ozone gas from which nitrogen oxide is removed is supplied to an intended processing object, for example. Specifically, in the case of supplying an ozone gas from the removing cylinder 251, the valve 233 is opened with the valve 234 closed. At this time, the ozone gas is supplied from the removing cylinder 251 to an unillustrated processing object, for example, through the first outflow pipe 214 and the pipes 215 and 217. In the case of supplying the ozone gas from the removing cylinder 252, the valve 237 is opened with the valve 238 closed. At this time, the ozone gas is supplied from the removing cylinder 252 to the processing object, for example, through the second outflow pipe 223 and the pipes 220 and 217. Through the foregoing procedure, the ozone gas from which nitrogen oxide is removed is supplied to the processing object, for example.

In the manner described above, in the fourth embodiment, the ozone gas from which nitrogen oxide is removed can be continuously supplied at a stable concentration.

Fifth Embodiment

Figure 18:
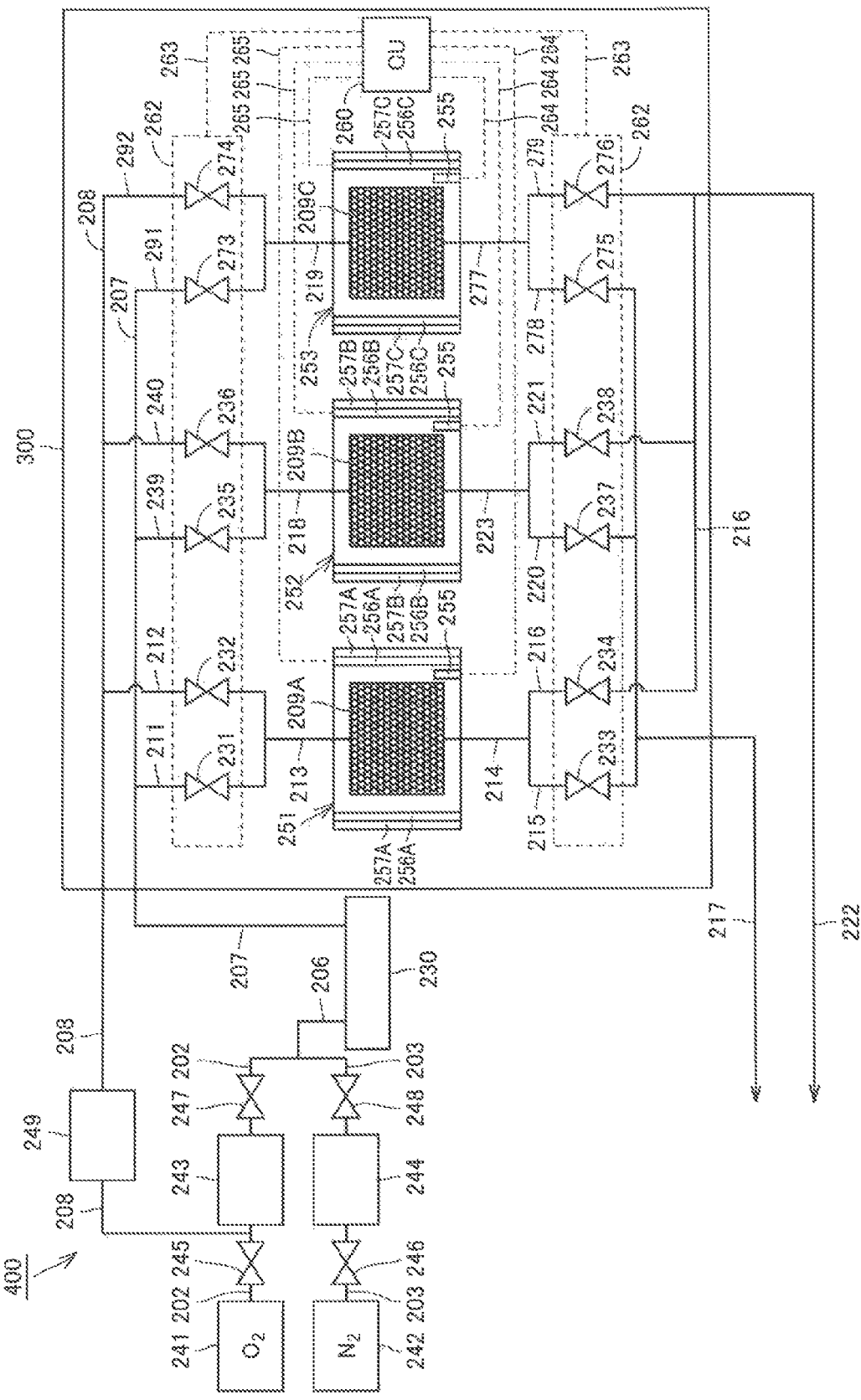
FIG. 18 is a schematic drawing illustrating example configurations of an ozone gas supply apparatus and an ozone gas removing apparatus according to a fifth embodiment.

1. Configurations of Ozone Gas Supply Apparatus and Nitrogen Oxide Removing Device According to Embodiment A fifth embodiment as another embodiment of the present invention will now be described. FIG. 18 is a schematic drawing illustrating example configurations of an ozone gas supply apparatus and a nitrogen oxide removing device according to the fifth embodiment. An ozone gas supply apparatus 400 and a nitrogen oxide removing device 300 according to the fifth embodiment basically have configurations similar to those of the fourth embodiment, and can obtain similar advantages when being controlled similarly. The fifth embodiment, however, is different from the fourth embodiment in that the nitrogen oxide removing device 300 includes a removing cylinder 253 having a configuration similar to those of the removing cylinders 251 and 252.

With reference to FIG. 18, the ozone gas supply apparatus 400 according to the fifth embodiment includes the removing cylinder 253 having a configuration similar to that of the removing cylinder 251, in addition to the case of the fourth embodiment. The removing cylinder 253 holds a third adsorbent 209C of silica gel corresponding to the first adsorbent 209A in the removing cylinder 251, and is connected to or is provided with a junction pipe 219 connected to a third ozone gas pipe 291 and a third purge gas pipe 292, a third outflow pipe 277, a temperature adjuster 256C, and a jacket 257C respectively corresponding to the junction pipe 213 connected to the first ozone gas pipe 211 and the first purge gas pipe 212, the first outflow pipe 214, the temperature adjuster 256A, and the jacket 257A. The third outflow pipe 277 is connected to pipes 278 and 279. The pipe 278 is connected to a pipe 217 connected to an unillustrated process line. The pipe 279 is connected to a pipe 222 connected to an unillustrated vent. The pipe 278 is provided with a valve 275. The pipe 279 is provided with a valve 276.

An adsorption state determining section 261 of a control section 260 according to the fifth embodiment determines a state of adsorption of a nitrogen oxide in the third adsorbent 209C, in addition to the case of the fourth embodiment. The control section 260 according to the fifth embodiment is electrically connected to a temperature detection sensor 255, and a temperature adjuster 256C disposed in the removing cylinder 253, and valves 273, 274, 275, and 276 (valve group 262), and controls these components similarly to a temperature detection sensor 255, and a temperature adjuster 256A disposed in the removing cylinder 251, and valves 231, 232, 233, and 234.

2. Method for Supplying Ozone Gas and Method for Removing Nitrogen Oxide According to Embodiment A method for supplying an ozone gas and a method for removing a nitrogen oxide according to the fifth embodiment are performed basically similarly to those in the fourth embodiment, and have advantages basically similar to those of the fourth embodiment. In the fifth embodiment, in a manner similar to the fourth embodiment, an ozone gas preparation step (S210) is performed and then a nitrogen oxide removal step (S220) is performed. In step S220 of the fifth embodiment, removal of the nitrogen oxide and reclamation of the adsorbent are sequentially performed at different timings among the removing cylinder 251, the removing cylinder 252, and the removing cylinder 253. Specifically, in the fifth embodiment, in the removing cylinder 253, similarly to the case of the removing cylinder 251 described with reference to FIG. 16 in the fourth embodiment, the nitrogen oxide adsorption step using the third adsorbent 209C (T210 through T230), the reclamation step of performing reclamation of the third adsorbent 209C and the cooling step (T240 through T310), and the ozone adsorbability reduction step of reducing ozone adsorbability by causing ozone to be adsorbed on the third adsorbent 209C whose nitrogen oxide adsorbability is restored (T320) are also performed. In adsorption of the nitrogen oxide and reclamation of the third adsorbent 209C in the removing cylinder 253, the valves 273, 274, 275, and 276 are opened and closed instead of the valves 231, 232, 233, and 234.

Figure 19:
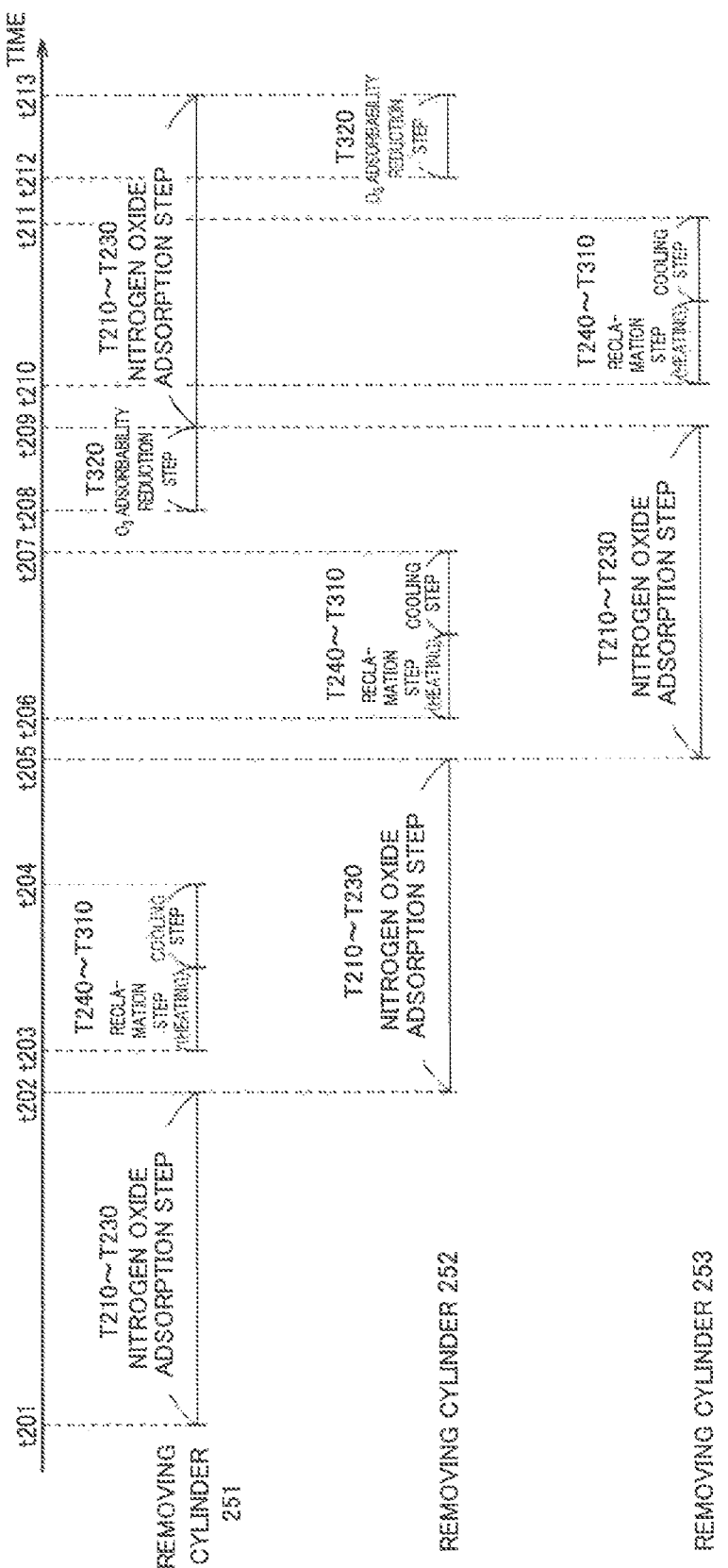
FIG. 19 is a timing chart depicting an example procedure of a nitrogen oxide removing step in the fifth embodiment.

In the fifth embodiment, the steps of T210 through T320 in the nitrogen oxide removal step (S220) are performed at different timings in the three removing cylinders 251, 252, and 253. That is, in this embodiment, the removing cylinder 253 is used as a third vessel for holding the third adsorbent to perform removal of the nitrogen oxide. A procedure of performing the nitrogen oxide removal step (S220) using the three removing cylinders 251, 252, and 253 will be described below. FIG. 19 is a timing chart depicting an example procedure of the nitrogen oxide removing step performed in the removing cylinders in the fifth embodiment.

In FIG. 19, the abscissa represents an elapsed time in the nitrogen oxide removal step. First, in time $t_{201}$ through $t_{202}$, the nitrogen oxide adsorption step (T210 through T230) is performed in the removing cylinder 251. Then, at time $t_{202}$ before nitrogen oxide adsorbability of the first adsorbent 209A in the removing cylinder 251 decreases across a tolerance, the inflow of the ozone gas is switched from the removing cylinder 251 to the removing cylinder 252. Thereafter, in time $t_{202}$ through $t_{205}$, the nitrogen oxide adsorption step is performed in the removing cylinder 252. On the other hand, in the removing cylinder 251, in time $t_{203}$ through $t_{204}$ included in time $t_{202}$ through $t_{205}$, the reclamation step and the cooling step (T240 through T310) are performed.

Then, at time $t_{205}$ before nitrogen oxide adsorbability of the second adsorbent 209B of the removing cylinder 252 decreases across the tolerance, the inflow of the ozone gas is switched from the removing cylinder 252 to the removing cylinder 253. In time $t_{205}$ through $t_{209}$, the nitrogen oxide adsorption step is performed in the removing cylinder 253. On the other hand, in the removing cylinder 252, in time $t_{206}$ through $t_{207}$ included in time $t_{205}$ through $t_{209}$, the reclamation step and the cooling step are performed.

In addition, in time $t_{208}$ through $t_{209}$ included in time $t_{205}$ through $t_{209}$, the ozone adsorbability reducing step (T320) is performed in the removing cylinder 251. Specifically, in time $t_{208}$ through $t_{209}$, the following step is performed. The ozone gas is introduced into the removing cylinder 253 so that the nitrogen oxide is adsorbed on the third adsorbent 209C. While the ozone gas having a reduced nitrogen oxide concentration is ejected from the removing cylinder 253, the ozone gas is introduced into the removing cylinder 251 so that ozone is adsorbed on the first adsorbent 209A having restored nitrogen oxide adsorbability, and thereby, ozone adsorbability of the first adsorbent 209A is reduced. Then, at time $t_{209}$ after the step of reducing ozone adsorbability and before a decrease of adsorbability of the third adsorbent 209C in the removing cylinder 253 across the tolerance, the inflow of the ozone gas is switched from the removing cylinder 253 to the removing cylinder 251. Thereafter, in time $t_{209}$ through $t_{213}$, the nitrogen oxide adsorption step is continuously performed in the removing cylinder 251.

On the other hand, in the removing cylinder 253, in time $t_{210}$ through $t_{211}$ included in time $t_{209}$ through $t_{213}$, the reclamation step and the cooling step are performed. In time $t_{212}$ through $t_{213}$ included in time $t_{209}$ through $t_{213}$, an ozone adsorbability reducing step is performed in the removing cylinder 252, and from $t_{213}$ when the ozone adsorbability reducing step is finished, a nitrogen oxide adsorption step (not shown) is continuously performed in the removing cylinder 252.

As described above, in the nitrogen oxide removal step (S220) in this embodiment, the ozone gas is introduced into the removing cylinder 251 before introduction of the ozone gas is switched from the removing cylinder 253 to the removing cylinder 251. Before subsequent introduction of the ozone gas is switched from the removing cylinder 251 to the removing cylinder 252, the ozone gas is introduced into the removing cylinder 252. Furthermore, before subsequent introduction of the ozone gas is switched from the removing cylinder 252 to the removing cylinder 253, the ozone gas is introduced into the removing cylinder 253. In the fifth embodiment, the foregoing procedure is repeatedly performed so that nitrogen oxide adsorbability is restored, and in the removing cylinder holding the adsorbent with reduced ozone adsorbability, removal of the nitrogen oxide in the ozone gas is performed. Subsequently, in a manner similar to the fourth embodiment, an ozone gas supply step (S230) is performed. In this embodiment, the nitrogen oxide removal step (S220) is performed as described above so that the ozone gas from which nitrogen oxide is removed can be continuously supplied at a stable concentration. In this embodiment, as the third vessel for holding the third adsorbent according to the present invention, the removing cylinder 253 is used for removal of the nitrogen oxide.

Although this embodiment is directed to the case where the nitrogen oxide removing device of the ozone gas supply apparatus includes two or three removing cylinders, the nitrogen oxide removing device may include four or more removing cylinders. This embodiment is directed to the case where the removing cylinders are operated at different timings one by one. Alternatively, the removing cylinders may be operated at different timings in units of removing cylinder groups each constituted by two or more removing cylinders.

In this embodiment, the temperature adjuster for adjusting the temperature inside the removing cylinder is disposed in each removing cylinder. Alternatively, one heating unit may heat the removing cylinders by using an infrared ray heater, for example. The embodiment described above are directed to the case where the oxygen gas storing unit 41 as an oxygen source and the nitrogen gas storing unit 42 as a nitrogen source are connected to the ozone generating device 230 as an ozone generator. Alternatively, the oxygen gas storing unit 41 may be connected to the ozone generating device 230 and the nitrogen gas storing unit 42 does not need to be connected to the ozone generating device 230. In such a case, a nitrogen oxide is included in an ozone gas generated by the ozone generating device 230 because of nitrogen included as an impurity in oxygen held by the oxygen gas storing unit 41.

In the embodiment described above, the adsorption state determining section determines the state of adsorption of the nitrogen oxide on silica gel (adsorbent) based on the inflow time of the ozone gas and the heating time by the temperature adjuster. Alternatively, a device for measuring a concentration of a nitrogen oxide, such as a Fourier transform infrared spectrophotometer (FTIR spectrophotometer), a quadrupole mass spectroscopy (Q-MS), or a nitrogen oxide detecting device disclosed in Japanese Patent Application Publication No. 2014-163720 may be disposed at a gas outflow port of the removing cylinder so that the state of adsorption of a nitrogen oxide on silica gel (adsorbent) may be determined based on the composition of a gas that has flowed out of the removing cylinder.

EXAMPLES

In a manner similar to the fourth embodiment, a method for supplying an ozone gas was performed by using the ozone gas supply apparatus 400 described in the fourth embodiment. Then, an experiment in which the concentrations of ozone and a nitrogen oxide contained in a gas ejected from the pipe 217 were observed with time. The ozone gas introduced into the removing cylinder in step T320 was caused to flow into the pipe 217 (Example). The concentrations of ozone and the nitrogen oxide were measured using a Fourier transform infrared spectrophotometer (FTIR spectrophotometer). The ozone concentration of a gas introduced into the nitrogen oxide removing device 300 was 8.6% by volume, and the flow rate thereof was 20 L/min. On the other hand, for comparison, in a case where the step of reducing ozone adsorbability by causing ozone to be adsorbed on the adsorbent (T320) is omitted, concentrations of ozone and the nitrogen oxide were similarly observed with time (Comparative Example).

Figure 20:
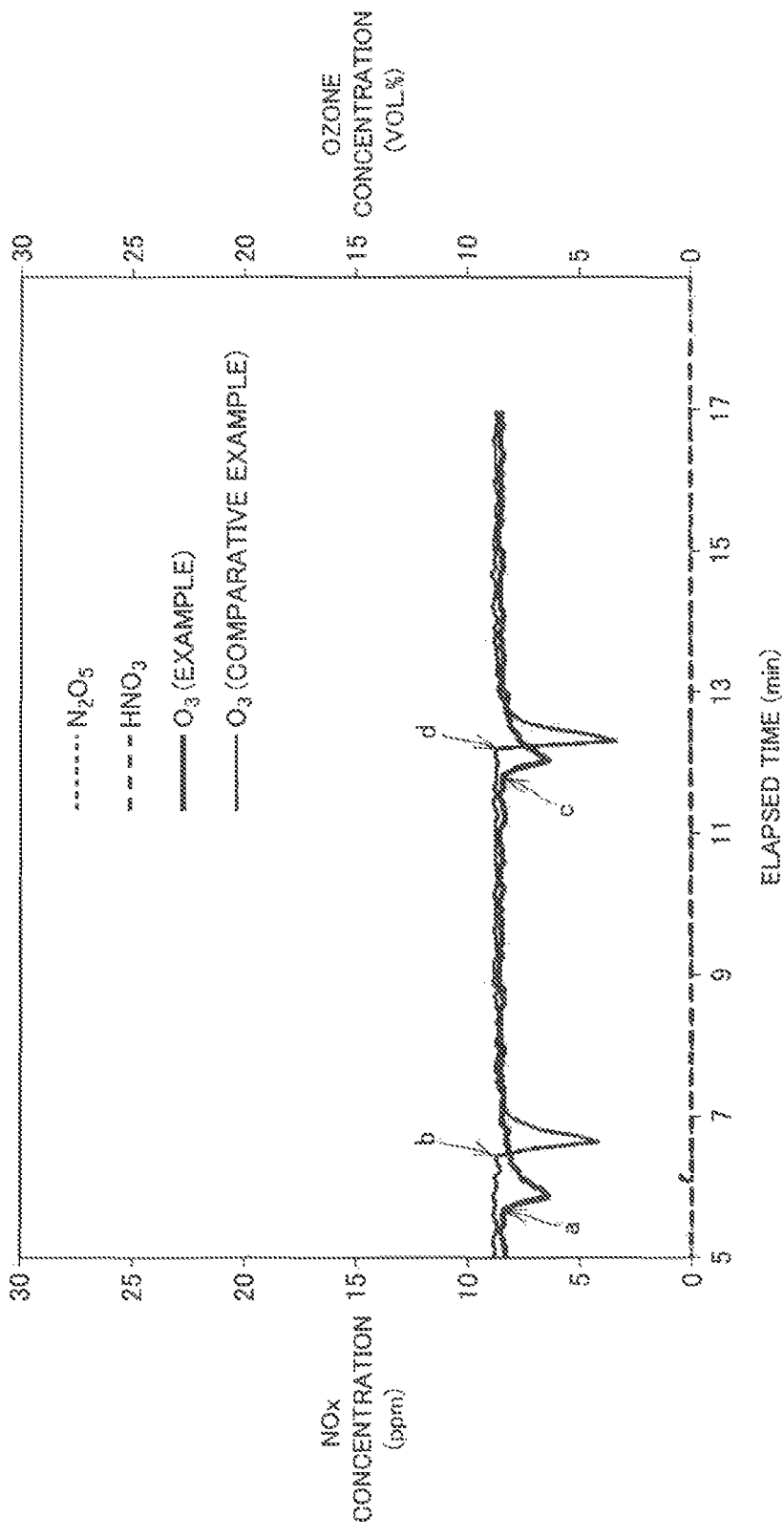
FIG. 20 is a graph showing changes with time of concentrations of ozone and a nitrogen oxide in a supplied gas.

FIG. 20 shows measurement results of ozone and a nitrogen oxide in an ozone gas in Example and Comparative Example. The bold continuous line in the graph represents the ozone concentration of Example, and the thin continuous line represents the ozone concentration in Comparative Example. The thin broken line represents the dinitrogen pentoxide concentration of Example, and the bold broken line represents the nitric acid concentration of Example.

With reference to FIG. 20, with the method for supplying an ozone gas of Example, stability of the concentration of the ozone gas to be supplied is enhanced as compared to Comparative Example. More specifically, the ozone concentration in Comparative Example rapidly decreases immediately after point b and point d at which the removing cylinders subjected to nitrogen oxide removal were exchanged. This is supposed to be because heating for restoring nitrogen oxide adsorbability also restores ozone adsorbability of the adsorbent (silica gel), and thus, in the removing cylinder immediately after start of nitrogen oxide removal, introduced ozone is more efficiently adsorbed on the adsorbent.

On the other hand, with respect to the ozone concentration of Example, although the ozone concentration decreases immediately after point a and point c corresponding to the start time of the step of reducing ozone adsorbability in the removing cylinder, since nitrogen oxide removal is performed at the same time in another removing cylinder in which ozone adsorbability is sufficiently reduced at that time, the range of a decrease of the ozone concentration is definitely reduced. In addition, the concentrations of dinitrogen pentoxide and nitric acid are sufficiently reduced.

From the foregoing experimental results, it was confirmed that with the method for removing a nitrogen oxide and the method for supplying an ozone gas according to the present invention, an ozone gas from which a nitrogen oxide is removed can be continuously supplied at a stable concentration.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The method for supplying an ozone gas and the system for supplying an ozone gas according to the present invention are advantageously applicable especially to a method for supplying an ozone gas and a system for supplying an ozone gas that require reduction of variations in concentration of an ozone gas to be supplied.

DESCRIPTION OF REFERENCE NUMERALS

1: ozone supply system, 10: ozone generating device, 11: discharge unit, 12: first electrode, 13: dielectric tube, 14: second electrode, 15: discharge space, 20: removing cylinder, 20A, 20B: first removing cylinder, 21: body, 22: ribbon heater, 23: jacket, 24: temperature sensor, 28: adsorbent holding part, 29: adsorbent, 30: ozone concentration detector, 40: control section, 51: oxygen source, 52: nitrogen source, 56: first mass flow controller, 57: second mass flow controller, 58: third mass flow controller, 59: fourth mass flow controller, 61, 62, 63, 64, 65, 66, 67, 68, 69A, 69B, 71A, 71B, 72, 73, 74, 75, 76, 77, 78: valve, 80, 81, 82, 83, 84, 85, 86, 87, 88, 89, 90, 91, 91A, 91B, 92, 92A, 92B, 96, 97, 98, 99, 100, 101, 102: pipe, 202: oxygen gas pipe, 203: nitrogen gas pipe, 206: junction pipe, 207: ozone gas transfer pipe, 208: purging oxygen gas pipe, 209A: first adsorbent, 209B: second adsorbent, 209C: third adsorbent, 211: first ozone gas pipe, 212: first purge gas pipe, 213: junction pipe, 214: first outflow pipe, 215, 216, 217: pipe, 218, 219: junction pipe, 220, 221, 222: pipe, 223: second outflow pipe, 230: ozone generating device, 231: first ozone gas valve, 232: first purge gas valve, 233, 234: valve, 235: second ozone gas valve, 236: second purge gas valve, 237, 238: valve, 239: second ozone gas pipe, 240: second purge gas pipe, 241: oxygen gas storing section, 242: nitrogen gas storing section, 243: oxygen flow rate adjuster, 244: nitrogen flow rate adjuster, 245, 246, 247, 248: valve, 249: purge gas flow rate adjuster, 251, 252, 253: removing cylinder, 255: temperature detection sensor, 256A, 256B, 256C: temperature adjuster, 257A, 257B, 257C: jacket, 258, 259: bottom wall, 260: control section, 261: adsorption state determining section, 262: valve group, 263: valve open/close signal, 264: temperature information signal, 265: temperature control information signal, 273, 274, 275, 276: valve, 277: third outflow pipe, 278, 279: pipe, 291: third ozone gas pipe, 292: third purge gas pipe, 300: ozone gas removing device, and 400: ozone gas supply apparatus.

What is claimed:

1. A method for supplying an ozone gas containing a nitrogen oxide from an ozone gas source to an object while switching the ozone gas between a state where the ozone gas is supplied to the object through a first channel provided with a first vessel holding a first adsorbent of silica gel and a state where the ozone gas is supplied to the object through a second channel, the method comprising the steps of:
   supplying the ozone gas from the ozone gas source to the object through the second channel; and
   switching the ozone gas from the ozone gas source to the state where the ozone gas is supplied to the object through the first channel so that the nitrogen oxide is adsorbed on the first adsorbent and supplying the ozone gas having a reduced concentration of the nitrogen oxide to the object, wherein the step of supplying the ozone gas from the ozone gas source through the second channel includes the step of, while supplying the ozone gas from the ozone gas source to the object through the second channel, introducing a part of the ozone gas from the ozone gas source to the first vessel so that the ozone gas is adsorbed on the first adsorbent and ozone adsorbability of the first adsorbent is reduced, and in the step of supplying the ozone gas from the ozone gas source to the object through the first channel, the ozone gas passes through the first vessel holding the first adsorbent whose ozone adsorbability is reduced in the step of reducing ozone adsorbability of the first adsorbent.

2. The method for supplying an ozone gas according to claim 1, wherein the step of switching the ozone gas from the ozone gas source to the state where the ozone gas is supplied to the object through the first channel so that the nitrogen oxide is adsorbed on the first adsorbent and supplying the ozone gas having a reduced concentration of the nitrogen oxide to the object, if nitrogen oxide concentration rise information that is information on a timing of a rise of a concentration of the nitrogen oxide contained in the ozone gas from the ozone gas source is detected, the ozone gas is switched to the state where the ozone gas is supplied to the object through the first channel based on the nitrogen oxide concentration rise information.

3. The method for supplying an ozone gas according to claim 2, wherein in the ozone gas source, the ozone gas is generated by electric discharge between electrodes disposed in a gas containing an oxygen gas as a main component, and the nitrogen oxide concentration rise information is information of a timing of a rise of a concentration of the nitrogen oxide by heating the electrodes to a temperature greater than or equal to a temperature at which dinitrogen pentoxide is vaporized.

4. The method for supplying an ozone gas according to claim 1, wherein the step of supplying the ozone gas from the ozone gas source through the second channel further includes, before the step of reducing ozone adsorbability of the first adsorbent, the step of restoring nitrogen oxide adsorbability of the first adsorbent by introducing a purge gas into the first vessel while heating the first adsorbent in the first vessel so that the nitrogen oxide adsorbed on the first adsorbent is separated and by emitting the separated nitrogen oxide out of the first vessel with the purge gas.

5. The method for supplying an ozone gas according to claim 4, wherein in the ozone gas source, the oxygen gas is generated by electric discharge in a gas containing an oxygen gas supplied from an oxygen source holding oxygen as a main component, and in the step of restoring nitrogen oxide adsorbability of the first adsorbent, the oxygen gas is supplied as the purge gas from the oxygen source.

6. The method for supplying an ozone gas according to claim 1, wherein in the step of supplying the ozone gas from the ozone gas source to the object through the second channel and the step of supplying the ozone gas from the ozone gas source to the object through the first channel, the ozone gas that has flowed in the first vessel disposed on the first channel or the second channel flows into a buffer vessel so that a concentration is leveled, and then, the ozone gas is supplied to the object.

7. A system for supplying an ozone gas, the system comprising:

an ozone gas source for supplying an ozone gas containing a nitrogen oxide;

a first channel in which the ozone gas from the ozone gas source is conveyed to an object;

a second channel in which the ozone gas from the ozone gas source is conveyed to the object; and a control section for controlling a supply path of the ozone gas from the ozone gas source to the object, wherein the first channel is provided with a first vessel for holding a first adsorbent of silica gel, the control section is configured to switch the ozone gas from the ozone gas source between a state where the ozone gas from the ozone gas source is supplied to the object through the second channel, and a state where the ozone gas from the ozone gas source is supplied to the object through the first channel provided with the first vessel so that the nitrogen oxide is adsorbed on the first adsorbent and the ozone gas having a reduced concentration of the nitrogen oxide is supplied to the object, the state where the ozone gas from the ozone gas source is supplied to the object through the second channel includes a state where while the ozone gas from the ozone gas source is supplied to the object through the second channel, a part of the ozone gas from the ozone gas source is introduced into the first vessel so that the ozone gas is adsorbed on the first adsorbent and ozone adsorbability of the first adsorbent is reduced, and the control section is configured to switch the ozone gas from the ozone gas source to the state where the ozone gas from the ozone gas source is supplied to the object through the first channel.

8. The system for supplying an ozone gas according to claim 7, further comprising a detector for detecting a timing of a rise of a concentration of the nitrogen oxide contained in the ozone gas from the ozone gas source and outputs nitrogen oxide concentration rise information noticing in advance a rise of the concentration of the nitrogen oxide contained in the ozone gas, wherein based on the nitrogen oxide concentration rise information, the control section switches the ozone gas to the state where the ozone gas is supplied to the object through the first channel.

9. The system for supplying an ozone gas according to claim 8, wherein the ozone gas source includes an electrode configured to generate an ozone gas by electric discharge in a gas containing an oxygen gas as a main component, and the detector for detecting a timing when the electrode is heated to a temperature greater than or equal to a temperature at which dinitrogen pentoxide is vaporized as the timing of the rise of the concentration of the nitrogen oxide.

10. The system for supplying an ozone gas according to claim 7, further comprising:

a purge gas inflow channel connected to the first vessel;

a heating unit for heating the first adsorbent; and a purge gas emission channel connected to the first vessel.

11. The system for supplying an ozone gas according to claim 10, further comprising:

an oxygen source connected to the ozone gas source, wherein the ozone gas source for generating an ozone gas by electric discharge in a gas containing an oxygen gas supplied from the oxygen source as a main component, and the oxygen source is connected to the purge gas inflow channel.

12. The system for supplying an ozone gas according to claim 7, wherein the first channel includes a junction region that is disposed downstream of the first vessel and merges with the second channel, and the junction region is provided with a buffer vessel configured to level a concentration of the ozone gas.

* * * * *